US011260985B2

(12) United States Patent
Taveira et al.

(10) Patent No.: US 11,260,985 B2
(45) Date of Patent: Mar. 1, 2022

(54) DETECTING WHEN A ROBOTIC VEHICLE IS STOLEN

(71) Applicant: QUALCOMM Incorporated, San Diego, CA (US)

(72) Inventors: Michael Franco Taveira, Rancho Santa Fe, CA (US); Naga Chandan Babu Gudivada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 16/376,374

(22) Filed: Apr. 5, 2019

(65) Prior Publication Data

US 2019/0308746 A1   Oct. 10, 2019

(30) Foreign Application Priority Data

Apr. 6, 2018 (IN) .............................. 201841013224

(51) Int. Cl.
*G05D 1/00* (2006.01)
*B64D 45/00* (2006.01)
(52) U.S. Cl.
CPC ................................ *B64D 45/0015* (2013.01)
(58) Field of Classification Search
None
See application file for complete search history.

(56) References Cited

U.S. PATENT DOCUMENTS

| | | | |
|---|---|---|---|
| 3,703,703 A | 11/1972 | Payne | |
| 5,845,733 A * | 12/1998 | Wolfsen | B60R 25/04 |
| | | | 340/5.53 |
| 7,602,947 B1 | 10/2009 | Lemelson et al. | |
| 8,718,821 B2 | 5/2014 | Chiappetta et al. | |
| 9,286,807 B2 | 3/2016 | Sundqvist et al. | |
| 9,524,648 B1 | 12/2016 | Gopalakrishnan et al. | |
| 9,905,133 B1 * | 2/2018 | Kumar | G08G 1/202 |
| 10,096,216 B1 | 10/2018 | McClintock | |

(Continued)

FOREIGN PATENT DOCUMENTS

| | | |
|---|---|---|
| CN | 107404347 A | 11/2017 |
| DE | 10154956 A1 | 5/2003 |

(Continued)

OTHER PUBLICATIONS

International Search Report and Written Opinion—PCT/US2019/026217—ISA/EPO—dated Jul. 17, 2019.

*Primary Examiner* — Brent Swarthout
(74) *Attorney, Agent, or Firm* — Qualcomm Incorporated

(57) ABSTRACT

Various methods enable a processor of a robotic vehicle to determine when the robotic vehicle has been stolen so that a self-recovery operation may be performed. Determining whether the robotic vehicle has been stolen may include evaluating, by a processor of the robotic vehicle, unauthorized use indicia, and determining that the robotic vehicle is stolen in response to determining that unauthorized use indicia exceed a threshold. Evaluating unauthorized use indicia may include determining whether an Integrated Circuit Card Identifier of a Subscriber Identify Module matches a stored value, determining whether a paired controller is different from a usual controller, determining whether the operator's skill has changed, and evaluating one or more trust factors that are observable features of normal operation.

36 Claims, 10 Drawing Sheets

(56) References Cited

U.S. PATENT DOCUMENTS

| | | | |
|---|---|---|---|
| 10,275,670 B1* | 4/2019 | Li | B60R 25/305 |
| 10,562,492 B2 | 2/2020 | Joao | |
| 2011/0092163 A1 | 4/2011 | Bourque | |
| 2014/0141749 A1 | 5/2014 | Madsen et al. | |
| 2014/0347482 A1 | 11/2014 | Weinmann et al. | |
| 2016/0127862 A1 | 5/2016 | Beattie, Jr. | |
| 2016/0152210 A1 | 6/2016 | Fulop | |
| 2017/0054725 A1 | 2/2017 | Manley | |
| 2017/0057634 A1* | 3/2017 | Hunt | G08G 5/0082 |
| 2017/0124789 A1 | 5/2017 | Rephlo | |
| 2017/0170972 A1* | 6/2017 | Wu | H04L 9/3226 |
| 2017/0233097 A1* | 8/2017 | Chang | G08G 5/0021 |
| | | | 701/3 |
| 2018/0047295 A1 | 2/2018 | Ricci | |
| 2018/0072265 A1* | 3/2018 | Samadani | B60K 28/04 |
| 2019/0077368 A1* | 3/2019 | Hwang | H04W 12/06 |
| 2019/0191311 A1 | 6/2019 | O'Brien et al. | |
| 2019/0310628 A1 | 10/2019 | Taveira et al. | |

FOREIGN PATENT DOCUMENTS

| | | |
|---|---|---|
| EP | 3159765 A1 | 4/2017 |
| EP | 3349085 A1 | 7/2018 |
| EP | 3349085 B1 | 5/2020 |
| JP | 2016186812 A | 10/2016 |
| WO | 2017042403 A1 | 3/2017 |

* cited by examiner

DETECTING WHEN A ROBOTIC VEHICLE IS STOLEN

RELATED APPLICATIONS

This application claims the benefit of priority to Indian Provisional Patent Application No. 201841013224 entitled "Detecting When A Robotic Vehicle Is Stolen," filed on Apr. 6, 2018, the entire contents of which are incorporated herein by reference.

BACKGROUND

Robotic vehicles, such as an unmanned autonomous vehicles (UAV) or drones, are being used for a wide variety of applications. Hobbyists constitute a large population of users of aerial drones ranging from simple and inexpensive to sophisticate and expensive. Autonomous and semi-autonomous robotic vehicles are also used for a variety of commercial and government purposes including aerial photography, survey, news reporting, cinematography, law enforcement, search & rescue, and package delivery to name just a few.

With their growing popularity and sophistication, aerial drones have also become a target of thieves. Being relatively small and lightweight, aerial drones can easily be snatched from the air and carried away. Robotic vehicles configured to operate autonomously, such as aerial drones configured to deliver packages to a package delivery location, may be particularly vulnerable to theft or other unauthorized and/or unlawful use(s).

SUMMARY

Various embodiments include methods of recovering a robotic vehicle. Various embodiments may include a processor of a robotic vehicle evaluating unauthorized use indicia and identifying that the robotic vehicle is stolen in response to determining that unauthorized use indicia exceed a threshold.

In some embodiments, evaluating unauthorized use indicia may include determining an Integrated Circuit Card Identifier (ICCID) of a Subscriber Identify Module (SIM) currently inserted in the robotic vehicle, retrieving an ICCID previously stored in a secure memory of the robotic vehicle, comparing the determined ICCID and the retrieved ICCID, and determining that the robotic vehicle is stolen in response to determining that the determined ICCID does not match the retrieved ICCID. In some embodiments, the retrieved ICCID may be an ICCID of a SIM belonging to an owner or authorized operator of the robotic vehicle and the retrieved ICCID was previously stored in the secure memory when the SIM belonging to the owner or authorized operator was initially installed in the robotic vehicle.

In some embodiments, evaluating unauthorized use indicia may include identifying a controller currently paired with the robotic vehicle and increasing an unauthorized use indicia value in response to determining that the currently paired robotic vehicle controller is a robotic vehicle controller not previously paired with the robotic vehicle.

In some embodiments, evaluating unauthorized use indicia may include evaluating operator skills based on current operations of the robotic vehicle and increasing an unauthorized use indicia value in response to determining that the evaluated operator skills differ from operator skills of an owner or authorized operator of the robotic vehicle.

In some embodiments, evaluating unauthorized use indicia may include evaluating one or more trust factors and increasing an unauthorized use indicia value in response to determining that one or more trust factors are not present. In some embodiments, an amount of increase in the unauthorized use indicia value is proportional to a number of trust factors that are not present.

In some embodiments, evaluating presence of one or more trust factors may include determining an amount of time that the robotic vehicle remains at a location removed from a normal operating area and determining that a trust factor is not present in response to determining that the time that the robotic vehicle remains at the location removed from a normal operating area exceeds a threshold.

In some embodiments, evaluating one or more trust factors may include determining identifiers of wireless access points within communication range of the robotic vehicle and determining that a trust factor is not present in response to determining that identifiers of wireless access points within communication range of the robotic vehicle differ from identifiers of wireless access points previously observed by the robotic vehicle.

In some embodiments, evaluating one or more trust factors may include attempting a two-factor authentication process with a current operator of the robotic vehicle and determining that a trust factor is not present in response to determining that the two-factor authentication process fails or is avoided by an operator.

Further embodiments include a robotic vehicle including a processor configured with processor-executable instructions to perform operations of the methods summarized above. Further embodiments include a non-transitory processor-readable storage medium having stored thereon processor-executable software instructions configured to cause a processor of a robotic vehicle to perform operations of the methods summarized above. Further embodiments include a robotic vehicle that includes means for performing functions of the operations of the methods summarized above.

BRIEF DESCRIPTION OF THE DRAWINGS

The accompanying drawings, which are incorporated herein and constitute part of this specification, illustrate exemplary embodiments of the claims, and together with the general description and the detailed description given herein, serve to explain the features of the claims.

DETAILED DESCRIPTION

Figure 1:
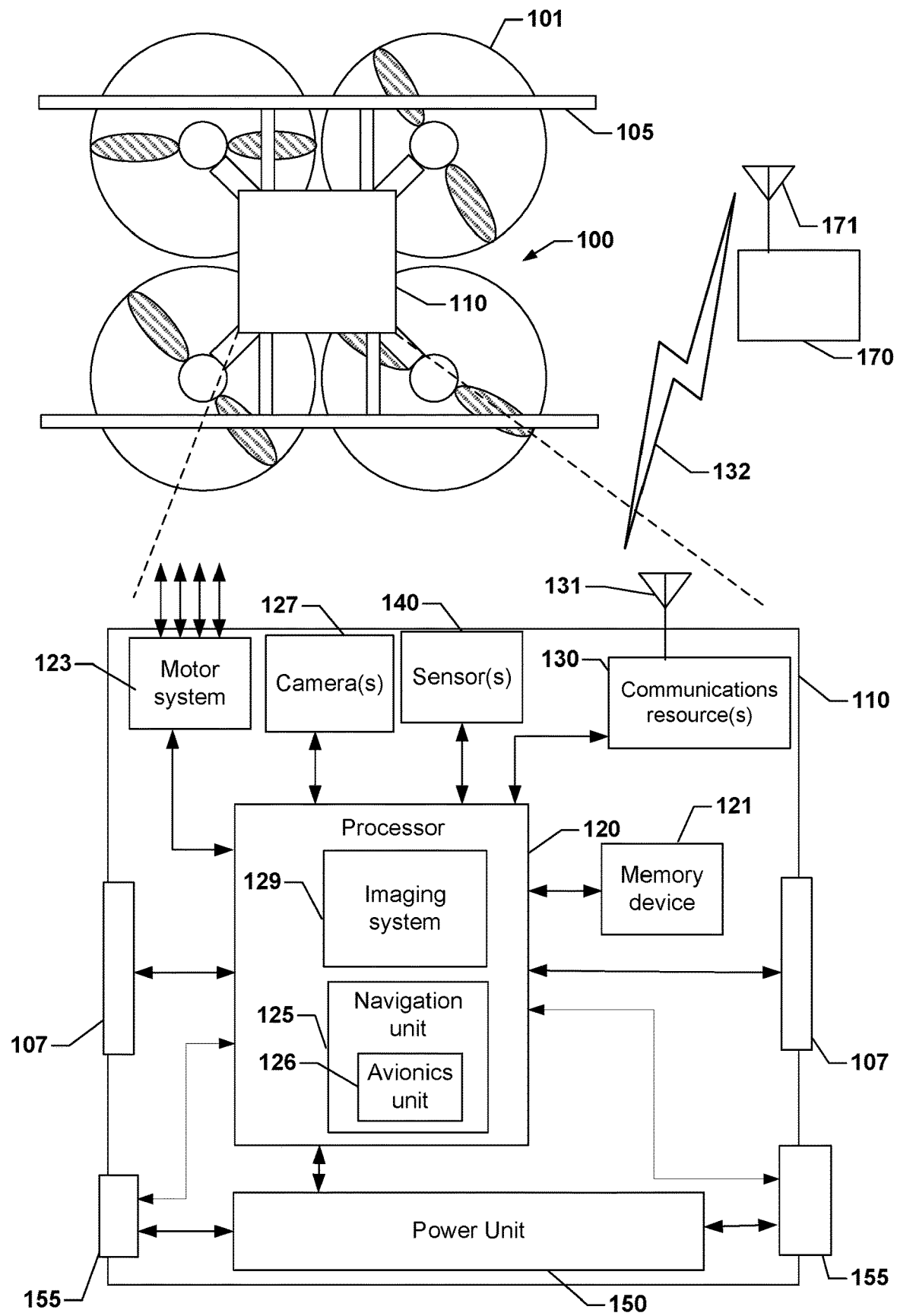
FIG. 1 is a block diagram illustrating components of a robotic vehicle, such as an aerial UAV suitable for use in various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Robotic vehicles, such as drones, aerial UAVs and autonomous motor vehicles, can be used for a variety of purposes. Unfortunately, unattended robotic vehicles are susceptible to theft as well as other unauthorized or unlawful uses. To address this vulnerability, various embodiments include methods for recovering a stolen robotic vehicle leveraging the capability of an autonomous robotic vehicle to take a variety of actions to facilitate recovery, including escaping (e.g., by flying or driving away) at an appropriate opportunity.

As used herein, the term "robotic vehicle" refers to one of various types of vehicles including an onboard computing device configured to provide some autonomous or semi-autonomous capabilities. Examples of robotic vehicles include but are not limited to: aerial vehicles, such as an unmanned aerial vehicle (UAV); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic vehicle may be manned. In some embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors.

A robotic vehicle may be configured to determine whether the robotic vehicle is stolen or is otherwise being operated in an unauthorized or unlawful fashion. In various embodiments, unauthorized or unlawful use of the robotic vehicle may include an operator, such as a child or teenager, operating the robotic vehicle without consent from the vehicle's owner and/or a parent. In some embodiments, unauthorized or unlawful use of the robotic vehicle may include an operator operating the robotic vehicle in a manner that is not permitted by law or statute or some contract, such as reckless or illegal behavior. Non-limiting examples of reckless or illegal behavior include as the operator being intoxicated, the operator sleeping, the operator or the vehicle doing something illegal such as speeding (exceeding a limit and/or for too long), evading the police, trespassing, or driving in a restricted area (e.g., wrong way on a one-way street).

Recognizing that the robotic vehicle has been stolen or is being operated in an unauthorized or unlawful manner may be made by a processor of the vehicle based on a number of criteria. For example, a robotic vehicle processor may determine that it has been moved to a new location inconsistent with past operations or storage, that a Subscriber Identification Module (SIM) has been replaced, that the robotic vehicle has been paired with a new controller, that skills of an operator have suddenly changed (e.g., operator skills have changed by some delta or difference threshold in a given time), that an escape triggering event (e.g., an owner indicating theft/unauthorized use via an app or portal) has been received, and/or that expected trust factors are no longer present (e.g., a change in nearby wireless devices (e.g., Internet of things (IoT) devices) and wireless access point identifiers (e.g., Wi-Fi SSID, cellular base station IDs, etc.), failed or avoided two-party authentication, unrecognized faces, existence or absence of other devices, etc.).

When a processor of the robotic vehicle has determined that the robotic vehicle is stolen, the processor may determine an appropriate opportunity to perform a recovery action, such as an attempt to escape by flying or driving away. For example, the processor may determine whether an operational state of the robotic vehicle (e.g., current battery charge state, projected operational range, configuration of vehicle hardware, etc.) is conducive to attempting an escape. Additionally or alternatively, the processor may determine whether environmental conditions (e.g., weather, air pressure, wind speed and direction, day/night, etc.) are suitable for attempting an escape. Additionally or alternatively, the processor may determine whether the robotic vehicle is separated enough from an unauthorized operator to avoid recapture if an escape is attempted. In various embodiments, such determinations may be performed in "real-time" to determine whether the robotic vehicle can escape or to recognize when an opportunity to escape arises. In some embodiments, such determinations may be performed in response to a triggering event, such as a user sending a signal to the robotic vehicle via an app or portal to inform the robotic vehicle that it is missing or stolen, or to instruct the robotic vehicle to attempt to escape. Alternatively or in addition, the processor may determine a time or set of circumstances in the future presenting an opportunity to attempt an escape, such as when vehicle state, environmental conditions, location and/or other consideration will or may be suitable for attempting an escape.

As the opportunity arises, the processor may take control of the robotic vehicle to perform a recovery action, such as involving an escape from capture and travel to a safe location. In doing so, the processor may ignore any commands sent to it by an operator control unit, and travel along the path determined by the processor to effectuate an escape. In various embodiments, the robotic vehicle may determine whether the robotic vehicle is able to travel to a predetermined location, such as a point of origin prior to being stolen, and/or an identified location under the control of an owner or authorized operator of the robotic vehicle, such as a home base or alternative parking location (e.g., a landing site for an aerial robotic vehicle) under control of the owner or authorized operator. This determination may be based on the operating state of the robotic vehicle (e.g., a charge state of the battery or fuel supply), the current location, and/or weather conditions (e.g., wind and precipitation conditions). For example, the processor may determine whether there is sufficient battery charge or fuel supply to travel from the present location to the predetermined location (e.g., a home-based) under the prevailing weather conditions.

If the processor determines that the robotic vehicle is able to travel to the predetermined location (e.g., a home base), then the robotic vehicle may proceed to travel to the predetermined location upon escaping from an unauthorized operator. In some embodiments, while proceeding to the predetermined location, the processor may control the robotic vehicle to exhibit or provide false or otherwise misleading information to the unauthorized operator. In some embodiments, exhibiting false or misleading information may include initially traveling in a direction away from the predetermined location before turning towards the predetermined location once beyond visual range. In some embodiments, exhibiting false or misleading information may include transmitting false location information (e.g., latitude and longitude) to a controller used by the unauthorized operator. In some embodiments, such misleading information may include an alarm message providing a false reason for the robotic vehicle's behavior (e.g., sending a message indicating a navigation or controller failure) and/or reporting that the robotic vehicle has crashed. In some embodiments, exhibiting false or misleading information may include the robotic vehicle shutting down or limiting features or components such that the robotic vehicle and/or continued operation of the robotic vehicle become undesirable to the unauthorized user (e.g., shut off cameras, continually slowing down the vehicle to a crawl, restrict altitude, etc.). The various feature/component shutdowns or limitations may be masked as errors and/or defects such that the unauthorized user views the robotic vehicle as defective, broken and/or unusable, and thus not worth continued stealing or unauthorized use. In some embodiments, the shutting down or limiting of features and/or components may occur at any time and may be performed to appear to progressively get worse with time (either in the number of features/components affected or the magnitude by which those are affected, or both).

If the processor determines that the robotic vehicle is not able to travel to the predetermined location upon escaping, the processor may identify an alternative "safe" location. An alternative "safe" location may be a location that, while not under the immediate control of an owner or authorized operator of the robotic vehicle, provides a place for the robotic vehicle to remain until the owner or authorized operator is able to recover the robotic vehicle without the risk or with minimal risk of being stolen again. Some nonlimiting examples of a safe location include a police station, the top of a high-rise building, an elevated wire such as a power line, a garage (e.g., locked garage), lockbox, behind some barrier (e.g., gate, fence, tire spikes, etc.), etc. In some embodiments, an alternative "safe" location may be selected from a list of predetermined safe locations stored in memory in a manner that cannot be erased by an unauthorized operator. Alternatively or in addition, an alternative "safe" location may be identified by the robotic vehicle based on a surrounding environment using a variety of data inputs, including for example cameras, navigation inputs (e.g., a satellite navigation receiver), radios, data sources accessible via the Internet (e.g., Google Maps), and/or communications with an owner or authorized operator (e.g., via message or email). For example, the processor of the robotic vehicle may capture one or more images of the surrounding environment and select a location to hide at based on image processing, such as identifying a garage in which a land robotic vehicle may park or a tall building or other structure on which an aerial robotic vehicle may be landed. As another example, the processor may determine its current location and using a map database, locate a nearest police station to which the robotic vehicle can escape.

Once an alternative "safe" location is identified, the processor may control the robotic vehicle to travel to the identified safe location. Again, in some embodiments, while proceeding to the predetermined location, the processor may control the robotic vehicle to provide false or otherwise misleading information to the unauthorized operator (e.g., a thief) as described. In some embodiments, the robotic vehicle may notify an owner or authorized operator of the identified safe location while in route to enable the owner to recover the robotic vehicle after it arrives.

Upon arrival at the identified safe location, the robotic vehicle may take actions to conserve power so that sufficient power remains to facilitate recovery, such as communicating with the owner or authorized operator via wireless communication links (e.g., cellular or Wi-Fi communications) and/or moving (e.g., flying) from the safe location to a location where the robotic vehicle can be recovered. For example, the robotic vehicle may enter a "sleep" or reduced power state to conserve battery power until recovery can be achieved. At regular or prescheduled intervals, the robotic vehicle may "wake" or exit the reduced power state in order to broadcast a wireless, visible or audible beacon, transmit a message to the owner or authorized operator (e.g., sending a text or email message), or otherwise facilitate recovery by the owner or authorized operator. Alternatively or in addition, the robotic vehicle may identify a charging/refueling location, travel to the identified charging/refueling location, charge and/or refuel, and then return to the identified safe location.

In some embodiments, the robotic vehicle may notify an owner or authorized operator that the robotic vehicle had been stolen and/or has arrived at the safe location. Alternatively or in addition, the robotic vehicle may notify an authority that the robotic typical has been stolen. For example, upon arriving at a police station, the robotic vehicle may emit a light or sound, such as a prerecorded message, to inform a police officer that the robotic vehicle was stolen and is in need of protection.

In various embodiments, travel to the predetermined location or an alternative "safe" location may include making an intermediate stop at a charging/refueling location. For example, the robotic vehicle may determine there is insufficient battery charge or fuel supply to travel from the present location to the predetermined location and/or an alternate "safe" location. However, the robotic vehicle may determine that an intermediate charging/refueling location exists along the route. In such circumstances, the robotic vehicle may proceed to the intermediate charging/refueling location and, after charging/refueling, may continue to proceed to the predetermined location or alternate "safe" location.

In some embodiments, if the processor determines that the robotic vehicle is unable to travel to a predetermined location and is unable to identify a "safe" location, the processor may cause the robotic vehicle to travel to an inaccessible location and/or self-destruct, such as drive into a lake, crash into a structure or perform a crash landing in an inaccessible location (e.g., a large body of water, a mountainside, etc.) in order to prevent the robotic vehicle from being recovered by the unauthorized operator. For example, if the robotic vehicle is equipped with proprietary or sensitive equipment or payload, destruction of the robotic vehicle may be preferable to falling into the hands of an unauthorized individual, and the processor may be configured to take such an action if necessary.

In some embodiments, in response to determining that the robotic vehicle is stolen, the processor may access sensors and wireless transceivers to capture information that may be useful to law enforcement for apprehending the individuals that stole the robotic vehicle. For example, the robotic vehicle may capture and record in memory one or more images or video of surroundings by a camera, audio from a microphone, and/or a geographical location of the robotic vehicle as well as a velocity of the robotic vehicle from a navigation system. In various embodiments, such captured information may be useful or otherwise helpful in identifying an unauthorized operator (i.e., a thief) and the location of the stolen robotic vehicle, as well as helping the processor determine how and when to escape.

In some embodiments, in response to determining that the robotic vehicle is stolen, the processor may control the robotic vehicle to trap or otherwise prevent an unauthorized occupant (e.g., a thief or unauthorized operator) from exiting the robotic vehicle. In various embodiments, the robotic vehicle may remain at a fixed location while holding the trapped occupant. Alternatively or in addition, the robotic vehicle may proceed to the predetermined location and/or alternate safe location while the unauthorized occupant remains trapped within the robotic vehicle. In some embodiments, the robotic vehicle may be configured not to "go home" so as not to reveal that location or other information to the trapped unauthorized occupant.

In some embodiments, the processor may cause one or more components and/or a payload of the robotic vehicle to self-destruct in response to determining that the robotic vehicle has been stolen. For example, if the robotic vehicle is carrying a sensitive and/or confidential payload (e.g., information on storage media or a hardware component having an unpublished design), the processor may take an action that destroys the payload (e.g., erasing a storage media or causing a hardware component within the payload to overheat). As another example, if the robotic vehicle includes one or more sensitive components, such as a proprietary sensor or a memory storing sensitive data (e.g., capture images), the processor may take an action that destroys the one or more components or otherwise renders the component less sensitive (e.g., erasing a storage media or causing the one or more components to overheat).

The terms Global Positioning System (GPS) and Global Navigation Satellite System (GNSS) are used interchangeably herein to refer to any of a variety of satellite-aided navigation systems, such as GPS deployed by the United States, GLObal NAvigation Satellite System (GLONASS) used by the Russian military, and Galileo for civilian use in the European Union, as well as terrestrial communication systems that augment satellite-based navigation signals or provide independent navigation information.

FIG. 1 illustrates an example aerial robotic vehicle 100 suitable for use with various embodiments. The example robotic vehicle 100 is a "quad copter" having four horizontally configured rotary lift propellers, or rotors 101 and motors fixed to a frame 105. The frame 105 may support a control unit 110, landing skids and the propulsion motors, a power source (power unit 150) (e.g., battery), a payload securing mechanism (payload securing unit 107), and other components. Land-based and waterborne robotic vehicles may include compliments similar to those illustrated in FIG. 1.

The robotic vehicle 100 may be provided with a control unit 110. The control unit 110 may include a processor 120, communication resource(s) 130, sensor(s) 140, and a power unit 150. The processor 120 may be coupled to a memory unit 121 and a navigation unit 125. The processor 120 may be configured with processor-executable instructions to control flight and other operations of the robotic vehicle 100, including operations of various embodiments. In some embodiments, the processor 120 may be coupled to a payload securing unit 107 and landing unit 155. The processor 120 may be powered from the power unit 150, such as a battery. The processor 120 may be configured with processor-executable instructions to control the charging of the power unit 150, such as by executing a charging control algorithm using a charge control circuit. Alternatively or additionally, the power unit 150 may be configured to manage charging. The processor 120 may be coupled to a motor system 123 that is configured to manage the motors that drive the rotors 101. The motor system 123 may include one or more propeller drivers. Each of the propeller drivers includes a motor, a motor shaft, and a propeller.

Through control of the individual motors of the rotors 101, the robotic vehicle 100 may be controlled in flight. In the processor 120, a navigation unit 125 may collect data and determine the present position and orientation of the robotic vehicle 100, the appropriate course towards a destination, and/or the best way to perform a particular function.

An avionics component 126 of the navigation unit 125 may be configured to provide flight control-related information, such as altitude, attitude, airspeed, heading and similar information that may be used for navigation purposes. The avionics component 126 may also provide data regarding the orientation and accelerations of the robotic vehicle 100 that may be used in navigation calculations. In some embodiments, the information generated by the navigation unit 125, including the avionics component 126, depends on the capabilities and types of sensor(s) 140 on the robotic vehicle 100.

The control unit 110 may include at least one sensor 140 coupled to the processor 120, which can supply data to the navigation unit 125 and/or the avionics component 126. For example, the sensor(s) 140 may include inertial sensors, such as one or more accelerometers (providing motion sensing readings), one or more gyroscopes (providing rotation sensing readings), one or more magnetometers (providing direction sensing), or any combination thereof. The sensor(s) 140 may also include GPS receivers, barometers, thermometers, audio sensors, motion sensors, etc. Inertial sensors may provide navigational information, e.g., via dead reckoning, including at least one of the position, orientation, or velocity (e.g., direction and speed of movement) of the robotic vehicle 100. A barometer may provide ambient pressure readings used to approximate elevation level (e.g., absolute elevation level) of the robotic vehicle 100.

In some embodiments, the navigation unit 125 may include a GNSS receiver (e.g., a GPS receiver), enabling GNSS signals to be provided to the navigation unit 125. A GPS or GNSS receiver may provide three-dimensional coordinate information to the robotic vehicle 100 by processing signals received from three or more GPS or GNSS satellites. GPS and GNSS receivers can provide the robotic vehicle 100 with an accurate position in terms of latitude, longitude, and altitude, and by monitoring changes in position over time, the navigation unit 125 can determine direction of travel and speed over the ground as well as a rate of change in altitude. In some embodiments, the navigation unit 125 may use an additional or alternate source of positioning signals other than GNSS or GPS. For example, the navigation unit 125 or one or more communication resource(s) 130 may include one or more radio receivers configured to receive navigation beacons or other signals from radio nodes, such as navigation beacons (e.g., very high frequency (VHF) omnidirectional range (VOR) beacons), Wi-Fi access points, cellular network sites, radio stations, etc. In some embodiments, the navigation unit 125 of the processor 120 may be configured to receive information suitable for determining position from the communication resources(s) 130.

In some embodiments, the robotic vehicle 100 may use an alternate source of positioning signals (i.e., other than GNSS, GPS, etc.). Because robotic vehicles often fly at low altitudes (e.g., below 400 feet), the robotic vehicle 100 may scan for local radio signals (e.g., Wi-Fi signals, Bluetooth signals, cellular signals, etc.) associated with transmitters (e.g., beacons, Wi-Fi access points, Bluetooth beacons, small cells (picocells, femtocells, etc.), etc.) having known locations, such as beacons or other signal sources within restricted or unrestricted areas near the flight path. The navigation unit 125 may use location information associated with the source of the alternate signals together with additional information (e.g., dead reckoning in combination with last trusted GNSS/GPS location, dead reckoning in combination with a position of the robotic vehicle takeoff zone, etc.) for positioning and navigation in some applications. Thus, the robotic vehicle 100 may navigate using a combination of navigation techniques, including dead-reckoning, camera-based recognition of the land features below and around the robotic vehicle 100 (e.g., recognizing a road, landmarks, highway signage, etc.), etc. that may be used instead of or in combination with GNSS/GPS location determination and triangulation or trilateration based on known locations of detected wireless access points.

In some embodiments, the control unit 110 may include a camera 127 and an imaging system 129. The imaging system 129 may be implemented as part of the processor 120, or may be implemented as a separate processor, such as an application specific integrated circuit (ASIC), a field programmable gate array (FPGA), or other logical circuitry. For example, the imaging system 129 may be implemented as a set of executable instructions stored in the memory unit 121 that execute on the processor 120 coupled to the camera 127. The camera 127 may include sub-components other than image or video capturing sensors, including auto-focusing circuitry, International Organization for Standardization (ISO) adjustment circuitry, and shutter speed adjustment circuitry, etc.

The control unit 110 may include one or more communication resources 130, which may be coupled to at least one transmit/receive antenna 131 and include one or more transceivers. The transceiver(s) may include any of modulators, de-modulators, encoders, decoders, encryption modules, decryption modules, amplifiers, and filters. The communication resource(s) 130 may be capable of device-to-device and/or cellular communication with other robotic vehicles, wireless communication devices carried by a user (e.g., a smartphone), a robotic vehicle controller, and other devices or electronic systems (e.g., a vehicle electronic system). To enable cellular communications, the communication resources 130 may include one or more SIM cards 131 that store identifier and configuration information that enable establishing a cellular data communication link with a cellular network. SIM cards 131 typically include an Integrated Circuit Card Identifier (ICCID), which is a unique identifier that uniquely identifies that SIM card 131 to the cellular network.

The processor 120 and/or the navigation unit 125 may be configured to communicate through the communication resource(s) 130 with a wireless communication device 170 through a wireless connection (e.g., a cellular data network) to receive assistance data from the server and to provide robotic vehicle position information and/or other information to the server.

A bi-directional wireless communication link 132 may be established between transmit/receive antenna 131 of the communication resource(s) 130 and the transmit/receive antenna 171 of the wireless communication device 170. In some embodiments, the wireless communication device 170 and robotic vehicle 100 may communicate through an intermediate communication link, such as one or more wireless network nodes or other communication devices. For example, the wireless communication device 170 may be connected to the communication resource(s) 130 of the robotic vehicle 100 through a cellular network base station or cell tower. Additionally, the wireless communication device 170 may communicate with the communication resource(s) 130 of the robotic vehicle 100 through a local wireless access node (e.g., a WiFi access point) or through a data connection established in a cellular network.

In some embodiments, the communication resource(s) 130 may be configured to switch between a cellular connection and a Wi-Fi connection depending on the position and altitude of the robotic vehicle 100. For example, while in flight at an altitude designated for robotic vehicle traffic, the communication resource(s) 130 may communicate with a cellular infrastructure in order to maintain communications with the wireless communication device 170. For example, the robotic vehicle 100 may be configured to fly at an altitude of about 400 feet or less above the ground, such as may be designated by a government authority (e.g., FAA) for robotic vehicle flight traffic. At this altitude, it may be difficult to establish communication links with the wireless communication device 170 using short-range radio communication links (e.g., Wi-Fi). Therefore, communications with the wireless communication device 170 may be established using cellular telephone networks while the robotic vehicle 100 is at flight altitude. Communications with the wireless communication device 170 may transition to a short-range communication link (e.g., Wi-Fi or Bluetooth) when the robotic vehicle 100 moves closer to a wireless access point.

While the various components of the control unit 110 are illustrated in FIG. 1 as separate components, some or all of the components (e.g., the processor 120, the motor system 123, the communication resource(s) 130, and other units)

may be integrated together in a single device or unit, such as a system-on-chip. A robotic vehicle 100 and the control unit 110 may also include other components not illustrated in FIG. 1.

Figure 2:
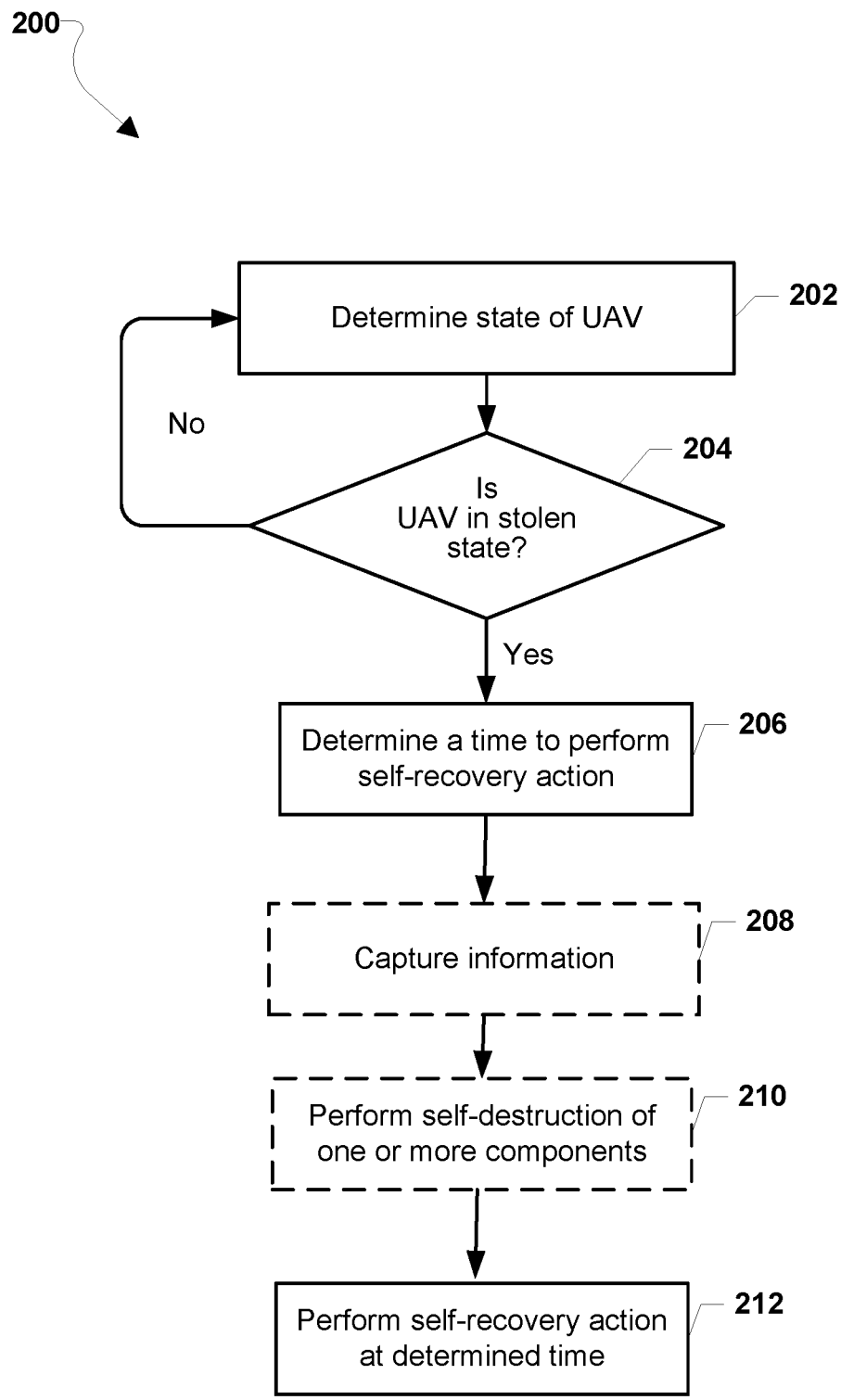
FIG. 2 is a process flow diagram illustrating a method of recovering a robotic vehicle, such as an aerial UAV, according to various embodiments.

FIG. 2 illustrates a method 200 for performing one or more recovery actions by a stolen robotic vehicle according to various embodiments. With reference to FIGS. 1-2, the operations of the method 200 may be performed by one or more processors (e.g., the processor 120) of a robotic vehicle (e.g., 100). The robotic vehicle may have sensors (e.g., 140), cameras (e.g., 127), and communication resources (e.g., 130), that may be used for gathering information useful by the processor for determining whether the robotic vehicle has been stolen and for determining an opportunity (e.g., conditions and/or a day and/or time) for the robotic vehicle to perform one or more recovery actions.

In block 202, a processor of the robotic vehicle may determine a current state of the robotic vehicle, particularly states and information that may enable the processor to detect when the robotic vehicle has been stolen. For example, the processor of the robotic vehicle may use a variety of algorithms to evaluate various data from a variety of sensors, the navigation system (e.g., current location), operating states, communication systems (e.g., to determine a current state of the robotic vehicle to recognize when the robotic vehicle has been stolen.

In determination block 204, the processor may determine whether the robotic vehicle has been stolen. Any of a variety of methods may be used for this determination. In some embodiments, the processor may evaluate any number of unauthorized use indicia. For example, the processor may evaluate whether an authorized SIM has been replaced with an unauthorized SIM, whether a sudden change in operating skills has occurred, and/or the presence of trust factors. Trust factors refers to conditions that a robotic vehicle processor may observe and correlate to normal operating situations. Thus, the absence of one or more of such trust factors may be indications that the robotic vehicle has been stolen, particularly when combined with other indications. Some examples of missing or lacking trust factors may include, but are not limited to, an extended stay at a new location removed from usual operating and non-operating locations, changes in observable Wi-Fi access point identifiers, avoidance by the operator of two-factor authentication, unrecognized face and/or other biometric features of an operator, the existence of other unfamiliar devices (e.g., Internet of Things (IoT) devices) within a surrounding area, the absence of familiar IoT devices, and/or the like.

In response to determining that the robotic vehicle is not stolen (i.e., determination block 204="No"), the processor may periodically determine a state of the robotic vehicle in block 202.

In response to determining that the robotic vehicle is stolen (i.e., determination block 204="Yes"), the processor may determine an opportunity to perform a recovery action in block 206. In various embodiments, the processor may determine an operational state of the robotic vehicle, may identify environmental conditions surrounding the robotic vehicle, and determine an amount of separation between the robotic vehicle and an unauthorized operator of the robotic vehicle, and analyze such information to determine whether the robotic vehicle has an opportunity to perform one or more recovery actions. Although determining an opportunity to perform a recovery action is shown as a single operation, this is only for simplicity. In this determination, the processor may evaluate whether the current state of the robotic vehicle, location, and surrounding conditions would enable a successful escape from whoever stole the robotic vehicle. Such conditions may include a current battery charge state or fuel supply, the current location of the robotic vehicle with respect to either a predetermined location (e.g., a home base) or a safe location, a current payload or configuration that may limit the range of the robotic vehicle, surroundings of the robotic vehicle (e.g., whether the robotic vehicle is outside where escape is possible or inside a building where escape would not be possible), weather conditions (e.g., when an precipitation) that may limit or extend the range of the robotic vehicle, the proximity of individuals who if too close might prevent an escape, and other circumstances and surroundings. If the processor determines that conditions are conducive to escaping, the processor may determine that the robotic vehicle has an immediate opportunity to perform a recovery action and do so immediately. However, if current conditions are not conducive to immediate escape, the processor may determine conditions in the future that may present on opportunity to perform one or more recovery actions, such as when escape is more likely to be feasible. For example, the processor may observe over time the way an unauthorized operator is using the robotic vehicle to determine whether there is a pattern, and a most conducive time within that pattern at which an escape may be accomplished. Additionally or alternatively, the processor may determine conditions to wait for in the future that will present an opportunity to attempt an escape. For example, the processor may determine the amount of battery charge or fuel supply that will be required to reach a predetermined location or a safe location given the present location, as well as other conditions that may be used by the processor to recognize when there is an opportunity to affect an escape maneuver. Such determinations may occur at a single point in time (e.g., a predictive determination of a future opportunity), repeatedly at various intervals of time (e.g., every five minutes), or continuously or otherwise in "real-time" (e.g., when the processor may determine that there is an immediate opportunity for performing one or more recovery actions based on the current operating state and conditions).

In some embodiments, the processor may control one or more sensors of the robotic vehicle to capture and store information that could be useful for law enforcement to identify and convict individuals who stole the robotic vehicle in optional block 208. For example, the processor may control an image sensor to capture and store one or more images of the area surrounding the robotic vehicle, such as images of the people handling the robotic vehicle. In another example, the processor may control a microphone to capture and record sounds, such as voices of the people handling the robotic vehicle. Alternatively or in addition, the processor may utilize navigation sensors and one or more other sensors to capture environmental conditions of the robotic vehicle, such as a direction of motion and/or velocity of travel.

In optional block 210, in some situations the processor may control one or more components of the robotic vehicle and/or a payload carried by the robotic vehicle to self-destruct or otherwise render inoperable or less sensitive the one or more components and/or payload, or information stored within such components or payload. For example, if storage media of the robotic vehicle contains sensitive or otherwise classified information (e.g., photographs taken while operating just prior to being stolen), the processor may cause the storage media to be erased of the such information in block 210. In another example, the robotic vehicle may contain a component having a proprietary design, in which case the processor may prompt self-destruction of the proprietary design, such as applying excess voltage to cause the complement to overheat, burn or melt. In a further example, if the robotic vehicle is carrying a valuable or sensitive payload, the processor may cause the payload to self-destruct so that the payload is no longer of value. As discussed, the processor may take any of a variety of action that destroys the value of the components or payload, such as erasing storage media and/or causing components to overheat. In this way, an unauthorized operator (e.g., a thief) may be precluded from acquiring proprietary information or technology, and an incentive to steal the robotic vehicle may be eliminated.

In block 212, the processor may control the robotic vehicle to perform a recovery action when the determined opportunity arises. In some situations, the recovery action may involve the processor controlling the robotic vehicle to return to a location of origin or otherwise proceed to a predetermined location under the control of an owner or authorized operator of the robotic vehicle. In situations in which the predetermined location cannot be reached (e.g., due to distance, battery charge state, etc.), the recovery action may involve the processor controlling the robotic vehicle to travel to a "safe" location. Such a "safe" location may be selected from a collection of predetermined "safe" locations based on evaluations performed by the processor. Alternatively or in addition, a "safe" location may be identified by the robotic vehicle. In some situations, the recovery action may involve the processor controlling the robotic vehicle to travel to an inaccessible location and/or self-destruct, such as by driving into a body of water, crashing into a structure, performing a crash landing in an inaccessible location, etc. In performing a recovery action, the processor may ignore signals from a ground controller and autonomously take over operational control and navigation of the robotic vehicle to reached the appropriate destination.

In some embodiments, recovery action performed in block 212 may include the processor of an occupant carrying terrestrial robotic vehicle actuating a door and/or locks to trap or otherwise prevent an unauthorized occupant (e.g., a thief or unauthorized operator) from exiting the robotic vehicle. In some embodiments, the robotic vehicle may remain at a fixed location while holding the trapped occupant. Alternatively or in addition, the robotic vehicle may proceed to the predetermined location and/or alternate safe location while the unauthorized occupant remains trapped within the robotic vehicle. In some embodiments, the robotic vehicle may be configured not to "go home" as part of the operations in block 212 so as not to reveal that location or other information to the trapped unauthorized occupant.

Figure 3A:
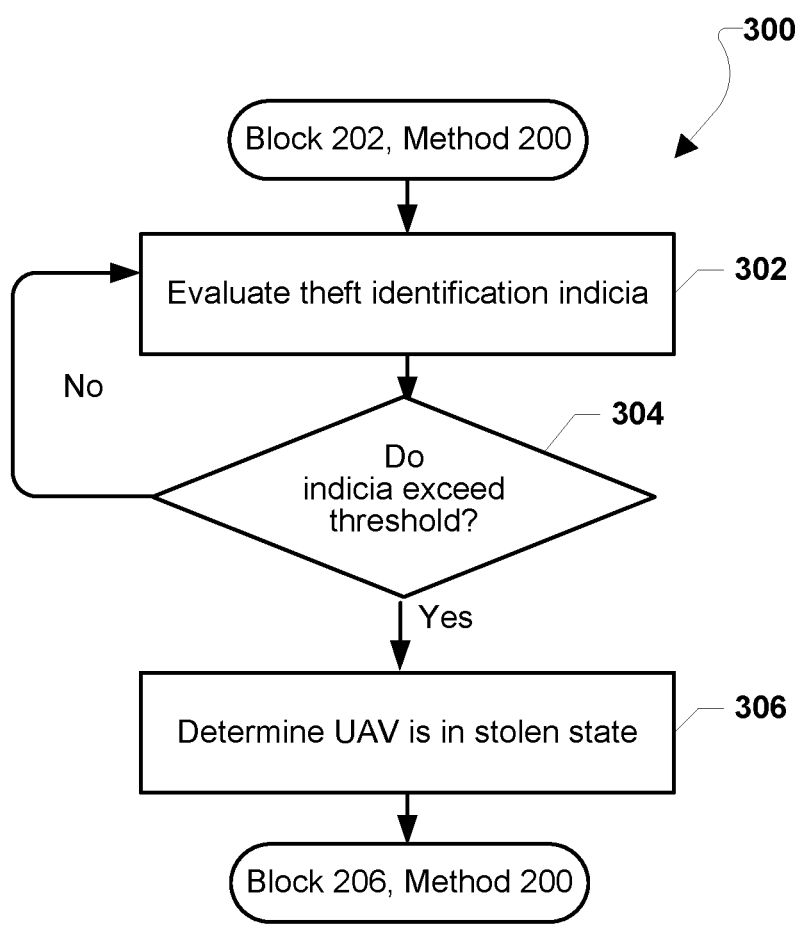
FIG. 3A is a process flow diagram illustrating a method for determining whether a robotic vehicle, such as an aerial UAV, is stolen according to various embodiments.

FIG. 3A illustrates a method 300 that a processor may use for determining whether the robotic vehicle has been stolen according to some embodiments. With reference to FIGS. 1-3A, the method 300 provides an example of operations that may be performed in block 202 of the method 200. The operations of the method 300 may be performed by one or more processors (e.g., the processor 120) of a robotic vehicle (e.g., the robotic vehicle 100).

In block 302, the processor may evaluate various indicia that when evaluated together may indicate that the robotic vehicle is subject to unauthorized use (referred to as unauthorized use indicia), such as when the robotic vehicle has been stolen, operated by an unauthorized operator, operated in a reckless or illegal manner, etc. Such unauthorized use indicia may include, but is not limited to, the robotic vehicle being at a new location (i.e., different from a normal operating area) for a protracted period of time, the presence of a new SIM card (e.g., 131) in communication resources (e.g., 130), a new/different controller pairing, a sudden change in operator skills or usage patterns by an amount that exceeds a delta or difference threshold, absence of one or more trust factors, and/or the like. For example, an unauthorized operator may replace the SIM card within a communication resource with another SIM card, which is an action that an owner is unlikely to do, which if combined with the robotic vehicle residing at a new location could indicate that the robotic vehicle has been stolen. As another example, and unauthorized operator may have a skill level or operating practices that are different from the owner or authorized operator of the robotic vehicle, and when the skill level or practices exceeds a delta or difference threshold, the processor may interpret this as unauthorized use indicia. In some embodiments, examples of trust factors may include, but are not limited to, the location of the robotic vehicle (for example, operating near a home base or within a usual operating zone is an indication that the current operator can be trusted), the identifiers of wireless devices and wireless access points (e.g., Wi-Fi access points, cellular base stations, etc.) within communication range of the robotic vehicle (for example, detecting the Wi-Fi identifier of the owner's Wi-Fi router is an indication that the current operator can be trusted), the existence (or lack thereof) of other devices (e.g., IoT devices) that are commonly nearby the robotic vehicle, and/or the like. Further examples of unauthorized use indicia include whether the operator avoids or refuses two-party authentication and performing facial recognition processing (or other biometric processing) of images of the operator and failing to recognize the operator's face (or biometrics). Further examples of unauthorized use indicia include operating the robotic vehicle in a manner that is not authorized for that operator, or is not permitted by law or statute or some contract, such as reckless or illegal behavior. Non-limiting examples of reckless or illegal behavior that may be unauthorized use indicia include as the operator being intoxicated, the operator sleeping, the operator or the vehicle doing something illegal such as speeding (exceeding a limit and/or for too long), evading the police, trespassing, or driving a terrestrial robotic vehicle in a restricted area (e.g., the wrong way on a one-way street).

In determination block 304, the processor may determine whether the observed unauthorized use indicia exceed a threshold that would indicate that the robotic vehicle is being operated in an unauthorized manner or has been stolen. Any single unauthorized use indicia alone may not be a reliable indicator of whether the robotic vehicle is being operated in an unauthorized manner or has been stolen. For example, while an unauthorized operator may not be skilled at operating the robotic vehicle, a new owner or authorized operator may also not be skilled at operating the robotic vehicle. As such, operator skill alone may be insufficient to determine that the robotic vehicle is being operated in an unauthorized manner or is stolen. However, a combination (e.g., a weighted combination) of such indicia may provide a more reliable indication. For example, a sudden change in operator skill and presence of an unauthorized SIM card may be sufficient to exceed a threshold. Any of a variety of methods may be used for this determination.

In response to determining that the unauthorized use indicia do not exceed a threshold (i.e., determination block 304="No"), the processor may continue to evaluating unauthorized use indicia in block 302.

In response to determining that unauthorized use indicia do exceed a threshold (i.e., determination block 304="Yes"), the processor may determine that the robotic vehicle is being operated in an unauthorized manner or is stolen in block 306 and proceed with the operations of block 206 of the method 200 as described.

Figure 3B:
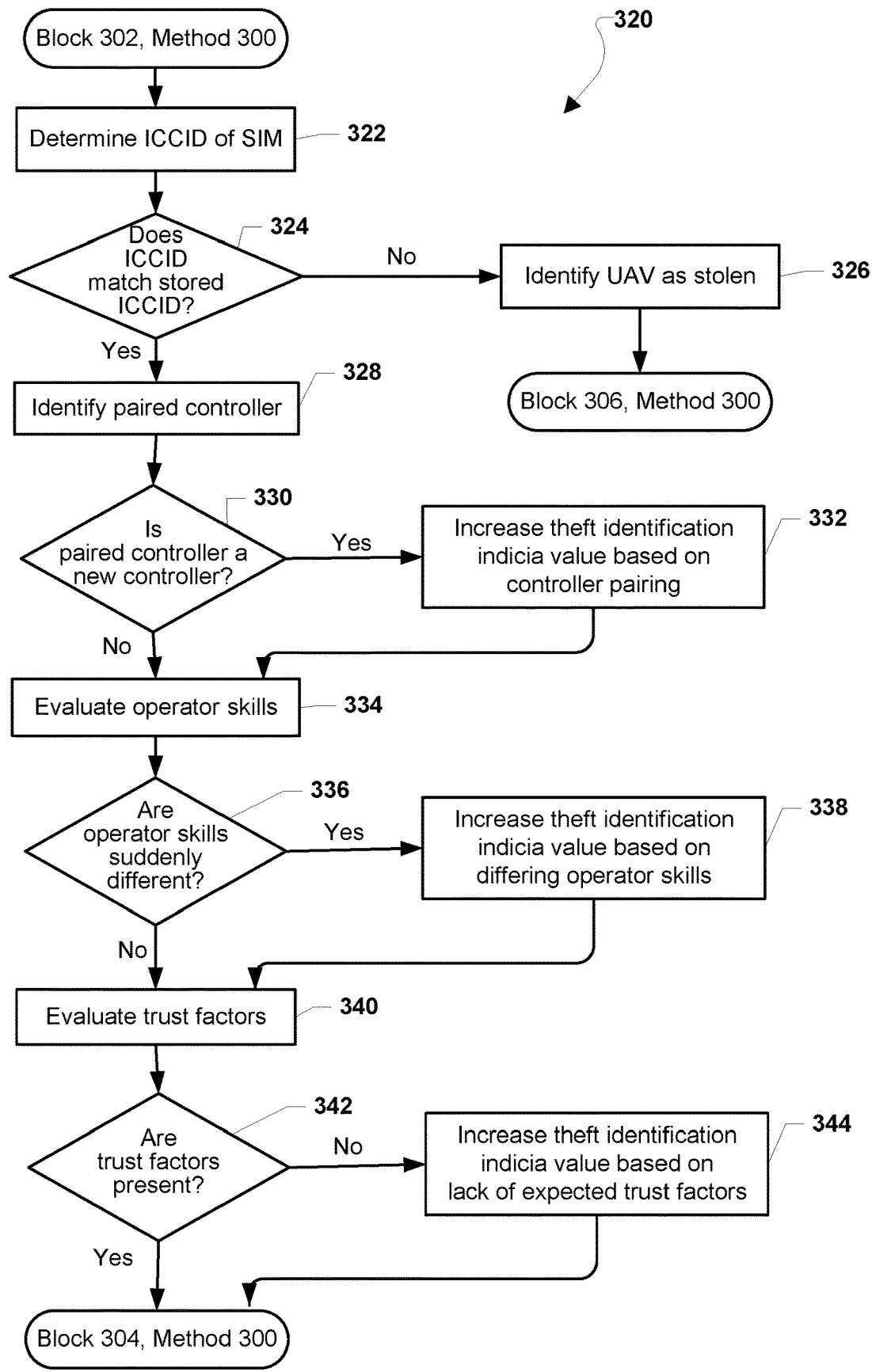
FIG. 3B is a process flow diagram illustrating a method of evaluating unauthorized use indicia as part of determining whether a robotic vehicle, such as a UAV, is stolen according to various embodiments.

FIG. 3B illustrates s method 320 that a processor may use for evaluating unauthorized use indicia as part of determining whether a robotic vehicle is being operated in an unauthorized manner or is stolen according to some embodiments. With reference to FIGS. 1-3B, the method 320 provides an example of operations that may be performed in block 302 of the method 300. The operations of the method 320 may be performed by one or more processors (e.g., the processor 120) of a robotic vehicle (e.g., the robotic vehicle 100).

In block 322, the processor may obtain the ICCID of a SIM card (e.g., 301) of a communications resource (e.g., 130) of the robotic vehicle. As described, the ICCID is within a SIM card to uniquely identify the SIM card to a wireless network. In various embodiments, an ICCID of a SIM card belonging to an owner or authorized operator of the robotic vehicle may be securely stored in a secure memory of the robotic vehicle, such as part of an initial configuration procedure.

In determination block 324, the processor may determine whether the ICCID of the currently inserted SIM card matches an ICCID stored in a secure memory of the robotic vehicle. If unauthorized operator replaces the SIM card with a new SIM card the ICCID of the new SIM card will not match the ICCID stored in secure memory.

In response to determining that the ICCID of the currently inserted SIM card does not match the ICCID stored in the secure memory of the robotic vehicle (i.e., determination block 324="No"), the processor may determine that the robotic vehicle is stolen in block 326 and proceed with the operations of block 306 of the method 300 as described.

In response to determining that the ICCID of the currently inserted SIM card matches the ICCID stored in the secure memory of the robotic vehicle (i.e., determination block 324="Yes"), the processor may identify a currently paired controller of the robotic vehicle in block 328. While a robotic vehicle may be easily stolen, a controller of an owner or authorized operator may not be stolen as easily. Thus, if the robotic vehicle is paired with a new controller, the likelihood that the robotic vehicle has been stolen is increased.

In determination block 330, the processor may determine whether a paired controller is a new controller (e.g., different from a controller used by an owner or authorized operator of the robotic vehicle).

In response to determining that the paired controller is a new controller (i.e., determination block 330="Yes"), the processor may increase an unauthorized use indicia value in block 332. In various embodiments, the amount that the unauthorized use indicia value is increased may be proportional to a correlation between a newly paired controller and a likelihood of the robotic vehicle having been stolen (e.g., if a newly paired controller is indicative of a strong likelihood that a robotic vehicle is stolen, then the amount of increase may be larger).

In response to determining that the paired controller is not a new controller (i.e., determination block 330="No") or after increasing the unauthorized use indicia in block 332, the processor may evaluate operations of the robotic vehicle in block 334. The processor may use any of a variety of algorithms for evaluating operator skills, operational maneuvers, operating area, etc. For example, the processor may monitor one or more sensors of the robotic vehicle and compare output of such monitoring with historical data, safe operational parameters, permitted operational areas, operational regulations, laws, statutes or contracts, etc.

In determination block 336, the processor may determine whether robotic vehicle operations have changed (e.g., from a change in operator skill level), are unauthorized, reckless, or contrary to a law, statute or contract prohibition. If any such factors are detected, this may be indicative of a different (e.g., unauthorized) operator of the robotic vehicle or unauthorized use of the robotic vehicle.

In response to determining that operator skills are suddenly different (i.e., determination block 336="Yes"), the processor may increase an unauthorized use indicia value in block 338. In various embodiments, the amount that the unauthorized use indicia value is increased may be proportional to the manner in which the robotic vehicle is being operated. For example, a correlation between sudden difference in operator skill and a likelihood of the robotic vehicle having been stolen (e.g., if sudden change in operator skill is indicative of a strong likelihood that a robotic vehicle is stolen, then the amount of increase in the unauthorized use indicia may be larger). As another example, operation of the robotic vehicle in a reckless manner or contrary to a law, statute or contract prohibition may be indicative of unauthorized use and the amount of increase in the unauthorized use indicia may be larger.

In response to determining that operator skills are not suddenly different (i.e., determination block 336="No") or after increasing the threat identification indicia in block 338, the processor may evaluate a variety of trust factors in block 340. The processor may obtain data related to various trust factors from any of a number of sensors and systems and use any of a variety of algorithms for evaluating trust factors. In various embodiments, trust factors may include, but are not limited to, location, wireless access point information, two-party authentication, presence of another robotic vehicle, and/or the like. For example, determining that an amount of time that the robotic vehicle remained at a location removed from a normal operating area exceeds a threshold is a trust factor that may indicate that unauthorized use indicia value should be increased. As another example, determining that identifiers of wireless access points (e.g., Wi-Fi access points, cellular base stations, etc.) differ from identifiers of wireless access points previously observed by the robotic vehicle is a trust factor that may indicate that unauthorized use indicia value should be increased. As another example, attempting a two-factor authentication process with a current operator of the robotic vehicle and determining that the operator is avoiding or fails the authentication is a trust factor that may indicate that unauthorized use indicia value should be increased. As another example, performing facial recognition processing of a face an image of a current operator of the robotic vehicle and failing to recognize the face of the current operator is a trust factor that may indicate that unauthorized use indicia value should be increased.

In determination block 342, the processor may determine whether one or more trust factors are present. If one or more trust factors are not present, then a likelihood that the robotic vehicle is being operated in an unauthorized manner or has been stolen may be increased. For example, if the robotic vehicle remains at an unexpected location for a long period of time, this may be because the robotic vehicle has been stolen. In another example, an unauthorized operator may change Wi-Fi settings of the robotic vehicle in order to associate the robotic vehicle with a Wi-Fi network of the unauthorized operator. In another example, an unauthorized operator may not be able to successfully perform two-factor authentication. In another example, the processor of the robotic vehicle may not recognize the face of the current operator using facial recognition processing.

In response to determining that one or more trust factors are not present (i.e., determination block 342="No"), the processor may increase an unauthorized use indicia value based on missing expected trust factors in block 344. In various embodiments, the amount that the unauthorized use indicia value is increased may be proportional to a number of missed trust factors. In some embodiments, the amount that the unauthorized use indicia value is increased may be larger or smaller based on which trust factor is lacking (e.g., lack of two-factor authentication may prompt a larger increase in the value while the increase may not be as large for an extended stay at a different location).

In response to determining that one or more trust factors are present (i.e., determination block 342="Yes") or after increasing the threat identification indicia in block 344, the processor may perform the operations of block 304 of method 300 as described.

Figure 4:
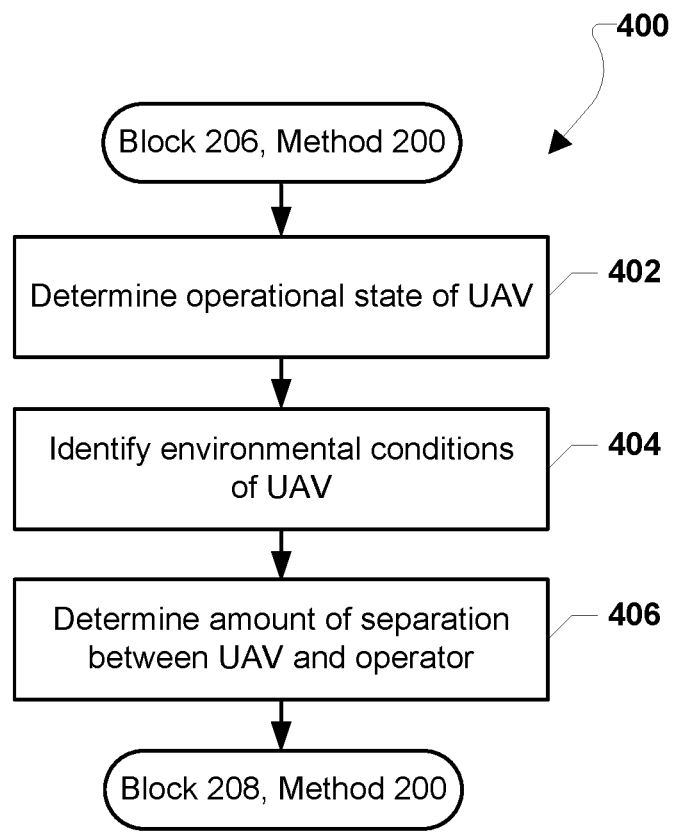
FIG. 4 is a process flow diagram illustrating a method for determining an opportunity to perform a recovery action by a robotic vehicle, such as an aerial UAV, according to various embodiments.

FIG. 4 illustrates a method 400 for determining an opportunity to perform a recovery action according to some embodiments. With reference to FIGS. 1-4, the method 400 provides an example of operations that may be performed in block 206 of the method 200. The operations of the method 400 may be performed by one or more processors (e.g., the processor 120) of a robotic vehicle (e.g., the robotic vehicle 100).

In block 402, the processor may determine an operational state of the robotic vehicle. For example, the processor may determine whether the robotic vehicle is at rest or in motion (e.g., in flight). In some embodiments, an in-flight operational state may indicate a more appropriate opportunity to perform a recovery action. In some embodiments, an at-rest operational state may indicate a more appropriate opportunity to perform a recovery action, such as when the robotic vehicle is at rest after having a battery fully charged. As another example, the processor may determine a battery charge state or fuel supply of the robotic vehicle, since attempting an escape with insufficient battery power reserve or fuel may lead to doom the recovery action. As a further example, the processor may determine whether there is a payload present or otherwise determine a weight or operating condition of the robotic vehicle that may restrict or otherwise limit the ability to affect an escape to a predetermined location or safe location.

In block 404, the processor may identify environmental conditions of the robotic vehicle. In some embodiments, the processor may control one or more sensors of the robotic vehicle to capture information indicating environmental conditions. For example, the processor may sample a wind speed sensor to determine a current wind speed. In another example, the processor may control an image sensor to capture one or more images of an area surrounding the robotic vehicle. In some embodiments, a clear sky with little to no winds when the robotic vehicle has a fully charged battery may indicate a more appropriate opportunity to perform a recovery action. In some embodiments, a cloudy sky with strong winds may indicate a better opportunity to escape (e.g., during a storm, an unauthorized operator may be less likely to pursue the robotic vehicle and winds may improve the range of the robotic vehicle in some directions).

In block 406, the processor may determine an amount of separation between the robotic vehicle and people. If the robotic vehicle is located too close to a person who could have stolen the robotic vehicle, and escape attempt could be thwarted. In some embodiments, this determination may be based on a channel of communication between the robotic vehicle and a controller operated by an unauthorized operator (e.g., a signal strength of the communication link). In some embodiments, the processor may analyze images of the surrounding area to determine whether there are any people within a threshold distance, and thus close enough to grab the robotic vehicle before the escape is accomplished. The processor may then proceed with the operations of block 208 of the method 200 as described.

Figure 5:
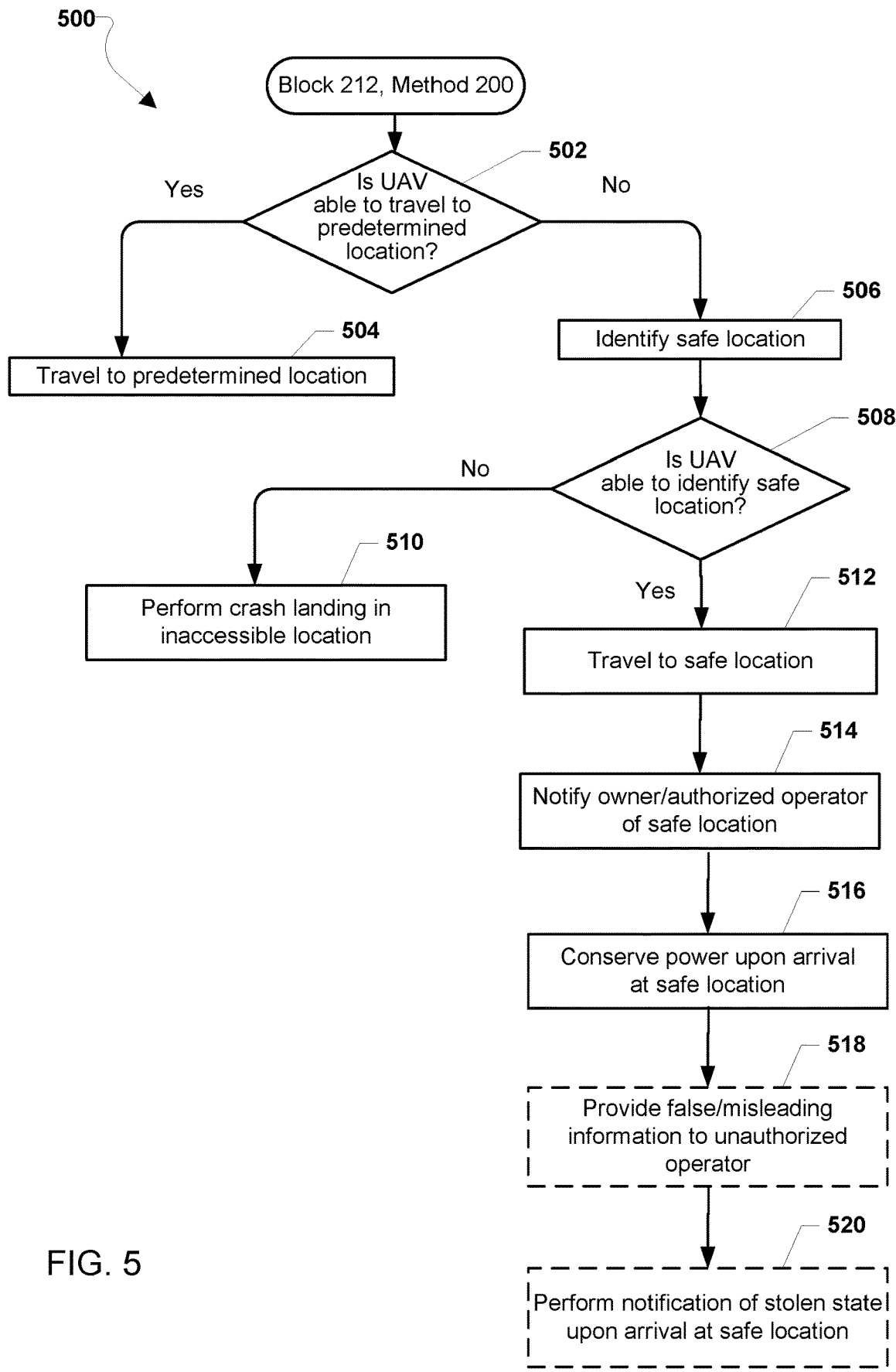
FIG. 5 is a process flow diagram illustrating a method for performing a recovery action by a robotic vehicle, such as an aerial UAV, according to some embodiments.

FIG. 5 illustrates a method 500 for a processor of a robotic vehicle to perform a recovery action according to some embodiments. With reference to FIGS. 1-5, the method 500 provides an example of operations that may be performed in block 212 of the method 200. The operations of the method 500 may be performed by one or more processors (e.g., the processor 120) of a robotic vehicle (e.g., the robotic vehicle 100).

In determination block 502, the processor may determine whether the robotic vehicle is able to travel to a predetermined location, such as a point of origin or other location under control of an owner or authorized operator of the robotic vehicle. For example, the processor of the robotic vehicle may use a variety of algorithms to evaluate various data points and/or sensor inputs to determine a current range of the robotic vehicle.

In response to determining that the robotic vehicle is able to travel to the predetermined location (i.e., determination block 502="Yes"), the processor may control the robotic vehicle to travel to the predetermined location in block 504. For example, if the predetermined location is within a current operational range of the robotic vehicle (e.g., as may be determined based upon a battery charge state or fuel supply), the robotic vehicle may immediately travel to that destination. In some embodiments, the robotic vehicle may identify a charging/refueling location, travel to the identified charging/refueling location, charge and/or refuel, and then continue to the predetermined location.

In optional block 505, the processor may provide false and/or misleading information to an unauthorized operator of the robotic vehicle while traveling to the predetermined location so as to make it less likely that the robotic vehicle can be intercepted before arriving there. For example, the processor may control the robotic vehicle to initially travel in a direction away from the predetermined location until out of sight of the unauthorize operator before turning toward the predetermined location. As another example, while the robotic vehicle is traveling toward the predetermined location, the processor may cause inaccurate geographical and/or navigational information to be transmitted to a controller in use by the unauthorized operator. For example, the processor may signal a controller used by the unauthorized operator indicating that the robotic vehicle is traveling east when the robotic vehicle is actually traveling north or the unauthorized operator may be informed that the robotic vehicle is traveling at a slow rate of speed when the robotic vehicle is actually traveling at a high rate of speed.

In some embodiments, providing false or misleading information in block 505 may include the robotic vehicle shutting down or limiting features or components such that the robotic vehicle and/or continued operation of the robotic vehicle become undesirable to the unauthorized user (e.g., shut off cameras, continually slowing down the vehicle to a crawl, restrict altitude, etc.). The various feature/component shutdowns or limitations may be masked as errors and/or defects such that the unauthorized user views the robotic vehicle as defective, broken and/or unusable, and thus not worth continued stealing or unauthorized use. In some embodiments, the shutting down or limiting of features and/or components may occur at any time and may be performed to appear to progressively get worse with time (either in the number of features/components affected or the magnitude by which those are affected, or both).

In response to determining that the robotic vehicle is not able to travel to the predetermined location (i.e., determination block 502="No"), the processor may identify a "safe" location. Any of a variety of methods may be used for such identification. In some embodiments, the processor may utilize a GPS receiver or other navigational capability to identify a geographical location of the robotic vehicle, and based on the identified geographical location, the processor may select a "safe" location from a collection of predefined safe locations, such as a database, data file, or other data store. In some embodiments, the processor may utilize an image sensor of the robotic vehicle is capture one or more images of an area surrounding the robotic vehicle, and based on image processing of the captured image(s), the processor may identify a "safe" location, such as a nearby building present in the captured image(s) in which the robotic vehicle could be parked or on which an aerial robotic vehicle could be landed.

In determination block 508, the processor may determine whether a "safe" location was identified.

In response to determining that a "safe" location was not identified (i.e., determination block 508="No"), the processor may control the robotic vehicle to travel to an inaccessible location and/or self-destruct, such as by driving into a body of water, crashing into a structure, performing a crash landing in an inaccessible location, etc. in block 510, such as if necessary to protect proprietary information or component technologies. For example, the robotic vehicle may be in a geographical location for which no "safe" locations were previously defined and/or the robotic vehicle may be unable to identify a "safe" location based on image processing. In such a case, an owner or authorized operator may prefer that the robotic vehicle travel to an inaccessible location and/or self-destruct rather than having an unauthorized operator utilize the robotic vehicle.

In response to determining that a "safe" location was identified (i.e., determination block 508="Yes"), the processor may control the robotic vehicle to travel to the identified "safe" location in block 512. For example, the robotic vehicle may proceed to a local police office, the roof of a high-rise building, an overhead wire, the top of a tall tree, or some other identified location. The processor may use any of a variety of navigational algorithms to control travel of the robotic vehicle. In some embodiments, the robotic vehicle may identify a charging/refueling location, travel to the identified charging/refueling location, charge and/or refuel, and then continue traveling to the identified safe location.

In optional block 514, the processor may provide false and/or misleading information to an unauthorized operator of the robotic vehicle so as to make it less likely that the robotic vehicle can be tracked or intercepted. For example, the processor may control the robotic vehicle to initially travel in a direction away from the "safe" location until out of sight of the unauthorize operator before turning toward the "safe" location. As another example, while the robotic vehicle is traveling to the "safe" location, the processor may provide inaccurate geographical and/or navigational information to the unauthorized operator. For example, the processor may signal a controller used by the unauthorized operator indicating that the robotic vehicle is traveling east when the robotic vehicle is actually traveling north or the unauthorized operator may be informed that the robotic vehicle is traveling at a slow rate of speed when the robotic vehicle is actually traveling at a high rate of speed. In this way, the unauthorized operator may be less likely to successfully track the robotic vehicle to the "safe" location.

In some embodiments, providing false or misleading information in block 514 may include the robotic vehicle shutting down or limiting features or components such that the robotic vehicle and/or continued operation of the robotic vehicle become undesirable to the unauthorized user (e.g., shut off cameras, continually slowing down the vehicle to a crawl, restrict altitude, etc.). The various feature/component shutdowns or limitations may be masked as errors and/or defects such that the unauthorized user views the robotic vehicle as defective, broken and/or unusable, and thus not worth continued stealing or unauthorized use. In some embodiments, the shutting down or limiting of features and/or components may occur at any time and may be performed to appear to progressively get worse with time (either in the number of features/components affected or the magnitude by which those are affected, or both).

In optional block 516, the processor may use various resources to perform notification of the stolen state of the robotic vehicle upon arrival of the robotic vehicle at the "safe" location. In some embodiments, the notification may include, but is not limited to, emitting an alarm (e.g., a siren), emitting/flashing a light (e.g., a strobe light), emitting an audio or video message, establishing a channel of communication with emergency personnel and/or an owner or authorized operator of the robotic vehicle, and/or the like. For example, if the "safe" location is a local police office, the processor may cause the robotic vehicle to emit an audible or visual indication that the robotic vehicle had been stolen. In various embodiments, notifications may be performed at any time prior to arrival at the safe location. For example, a stolen robotic vehicle may be flashing or emitting such signals the whole way (or part way) to the safe location or other intended destination. In some embodiments, the robotic vehicle may wait some time and/or distance before using such signals to minimize any risk that the unauthorized user may observe the signaling. In embodiments in which the unauthorized user is within the vehicle, the signaling may be transparent or unobvious to the occupant (e.g., hazard lights may be flashing the entire time, but within the vehicle there is no indication that the hazard lights are on).

In block 518, the processor may control one or more components of the robotic vehicle to notify an owner or authorized operator of the robotic vehicle of the identified "safe" location, as well as whether the robotic vehicle is on its way to that location or has arrived. For example, if the processor selects a local police office as the "safe" location to which the robotic vehicle will escape, an address of that police office may be transmitted to the owner or authorized operator. In some embodiments, the notification may be sent as an e-mail containing an indication of the "safe" location. In some embodiments, the notification may be sent as a text, Simple Message Service (SMS), Multimedia Message Service (MMS) or similar type message containing an indication of the "safe" location. In some embodiments, the notification may be sent using a Wi-Fi or cellular data wireless communication link. In some embodiments, the indication of the "safe" location may include an address or other indication of a geographical location of the "safe" location. In some embodiments, the indication of the "safe" location may include a name or other identifier of the "safe" location. In such embodiments, the intended recipient of the notification (e.g., an owner or authorized operator), may utilize the name or other identifier to determine a geographical location of the "safe" location. For example, to avoid undue disclosure of the "safe" location, the indication of the "safe" location may be an identifier, such as a number, which serves as an index into a collection of predefined "safe" locations known to the owner or authorized operator. The intended notification recipient may then utilize the identifier to reference the collection and determine a geographical location of the "safe" location. In this way, an unintended notification recipient (e.g., an unauthorized operator) may not be able to determine a geographical location of the "safe" location.

Once the robotic vehicle has arrived at the identified "safe" location, the processor may control one or more components of the robotic vehicle to conserve power in block 520. Conserving power may enable the robotic vehicle to periodically transmit status information to the owner or authorized operator and/or travel to the owners/authorized operator when recovery is possible (e.g., fly down from the top of the building when the owner is nearby). For example, upon arrival at the safe location, the robotic vehicle may enter a "sleep" or low power state to conserve power. In some embodiments, the processor may control one or more components to generate a beacon signal upon arrival and prior to entering the "sleep" or low power state. In some embodiments, the processor may control one or more components of the robotic vehicle to exit the "sleep" or low power state after a period of time and transmit another beacon signal or listen for communications from the owners/authorized operator. In such embodiments, the period of time between exiting the low power state may be predetermined or randomly generated. In some of these embodiments, a cycle of generating a beacon signal and/or listening for communications from an owner/authorized operator, entering a "sleep" or low power state, and exiting the "sleep" or low power state after a time period to generate another beacon signal may be repeated, either until recovery of the robotic vehicle or until the robotic vehicle has no remaining power. Each cycle may be repeated after the same period of time (e.g., every 30 minutes) or each cycle may be repeated after a differing period of time (e.g., first cycle after 30 minutes, second cycle after 15 minutes, third cycle after 45 minutes, etc.). In some embodiments, the robotic vehicle may identify a charging/refueling location, travel to the identified charging/refueling location, charge and/or refuel, and then return to the identified safe location. In this manner, the robotic vehicle may be able to remain at the safe location for an extended period of time without depleting its battery.

Figure 6A:
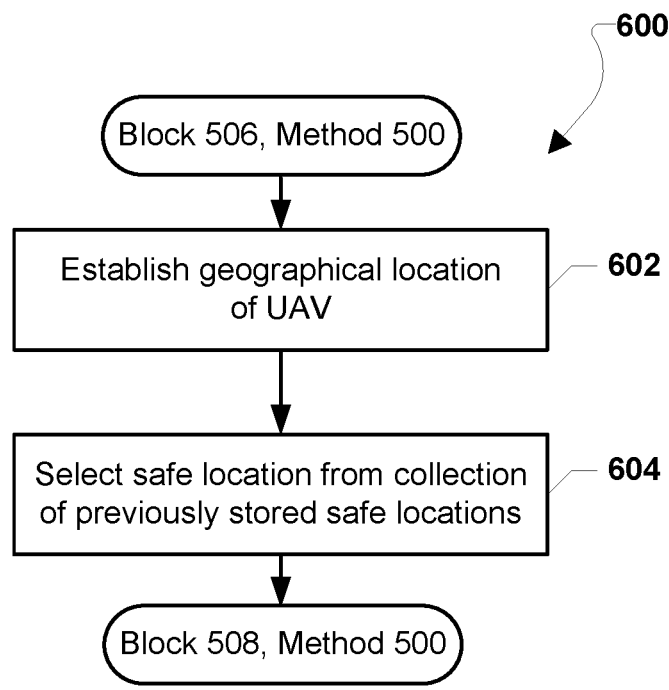
FIG. 6A is a process flow diagram illustrating a method for identifying a safe location by a robotic vehicle, such as an aerial UAV, according to various embodiments.
Figure 6B:
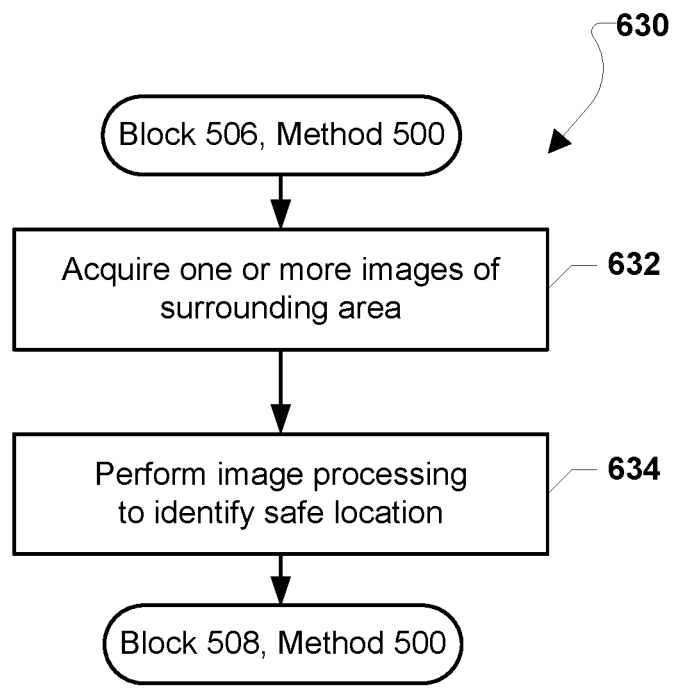
FIG. 6B is a process flow diagram illustrating an alternate method for identifying a safe location by a robotic vehicle, such as an aerial UAV, according to various embodiments.

FIGS. 6A-6B illustrate methods 600 and 630 for identifying a "safe" location according to some embodiments. With reference to FIGS. 1-6B, the methods 600 and 630 provide examples of operations that may be performed in block 506 of the method 500. The operations of the methods 600 and 630 may be performed by one or more processors (e.g., the processor 120) of a robotic vehicle (e.g., the robotic vehicle 100). The method 600 includes identifying a "safe" location based on a geographical location of the robotic vehicle and a collection of predefined "safe" locations. The method 630 includes identifying a "safe" location based on image processing.

Referring to the method 600, the processor may establish a geographical location of the robotic vehicle in block 602. In various embodiments, the processor may utilize one or more systems or sensors of the robotic vehicle to establish a geographical location based on any of a variety of navigational methods. For example, the processor may control a GPS receiver to determine geographic coordinates of the robotic vehicle.

In block 604, the processor may select a "safe" location from a collection of previously stored "safe" locations based upon the current location of the robotic vehicle. For example, the processor may use the established geographical location of the robotic vehicle as a look up value to retrieve a "safe" location from a database, data file, or other data store of predetermined "safe" locations linked or indexed to geographic coordinates. The processor may then proceed with the operations of block 508 of the method 500 as described.

Referring to the method 630, the processor may capture one or more images of an area surrounding the robotic vehicle in block 632. For example, the processor may control a camera (e.g., 127) or video camera of the robotic vehicle to capture one or more images (e.g., a video clip) of the surrounding area.

In block 634, the processor may perform image processing on the one or more captured images to identify a "safe" location. Such image processing may include analyzing structures or other elements within the image(s) to identify a location that may facilitate recovery by an owner or authorized operator of the robotic vehicle while precluding an unauthorized operator from regaining control of the robotic vehicle. As part of processing the one or more captured images, the processor may determine a direction of travel (e.g., a flight plan) for reaching the identified "safe" location. The processor may then proceed with the operations of block 508 of the method 500 as described.

Figure 6C:
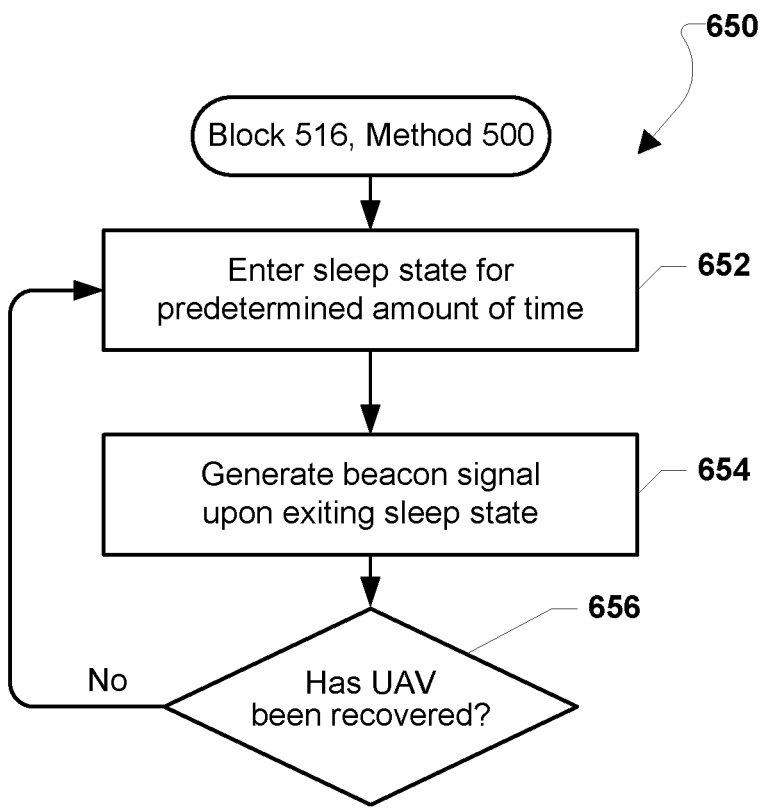
FIG. 6C is a process flow diagram illustrating a method for conserving power by a robotic vehicle, such as an aerial UAV, according to various embodiments.

FIG. 6C illustrates a method 650 for conserving power of a robotic vehicle after arriving at a "safe" location according to some embodiments. With reference to FIGS. 1-6C, the method 650 provides an example of operations that may be performed in block 520 of the method 500. The operations of the method 650 may be performed by one or more processors (e.g., the processor 120) of a robotic vehicle (e.g., the robotic vehicle 100).

In block 652, the processor may control the robotic vehicle to enter a sleep state for a predetermined amount of time. In some embodiments, the predetermined amount of time may have been randomly selected. Such operations may involve turning off most components of the robotic vehicle and placing the processor in a low power state. Such a low power state may involve setting and then maintaining a clock that counts down to the next time that the robotic vehicle should exit the sleep state.

In block 654, the processor may control the robotic vehicle to exit the sleep state and generate a beacon signal, transmit a message to the owner/authorized operator, and/or listen for communications from the owner/operator (e.g., querying a message database). For example, the processor may control a Bluetooth transceiver, Wi-Fi transceiver, and/or some other short-range wireless transceiver to generate a beacon signal. Such beacon signal may be received by a device operated by an owner or authorized operator of the robotic vehicle. In this way, the owner or authorized operator may be able to more easily recover the robotic vehicle at the "safe" location. As another example, the processor may establish a connection to a wireless communication network and transmit a message (e.g., SMS or email) updating the owners/authorized operator regarding a status of the robotic vehicle. As part of such operations, the processor may also receive messages from the owner/authorized operator, such as indicating when retrieval of the robotic vehicle will be attempted so that the processor can exit the sleep state at the appropriate time to facilitate recovery operations.

In determination block 656, the processor may determine whether the robotic vehicle has been recovered. In various embodiments, an owner or authorized operator of the robotic vehicle may power down the robotic vehicle, reset the robotic vehicle, or otherwise interrupt or terminate the method of recovery described herein upon recovering the robotic vehicle.

In response to determining that the robotic vehicle has not been recovered (i.e., determination block 656="No"), the processor may control the robotic vehicle to reenter a sleep state for a predetermined amount of time in block 652.

Figure 7:
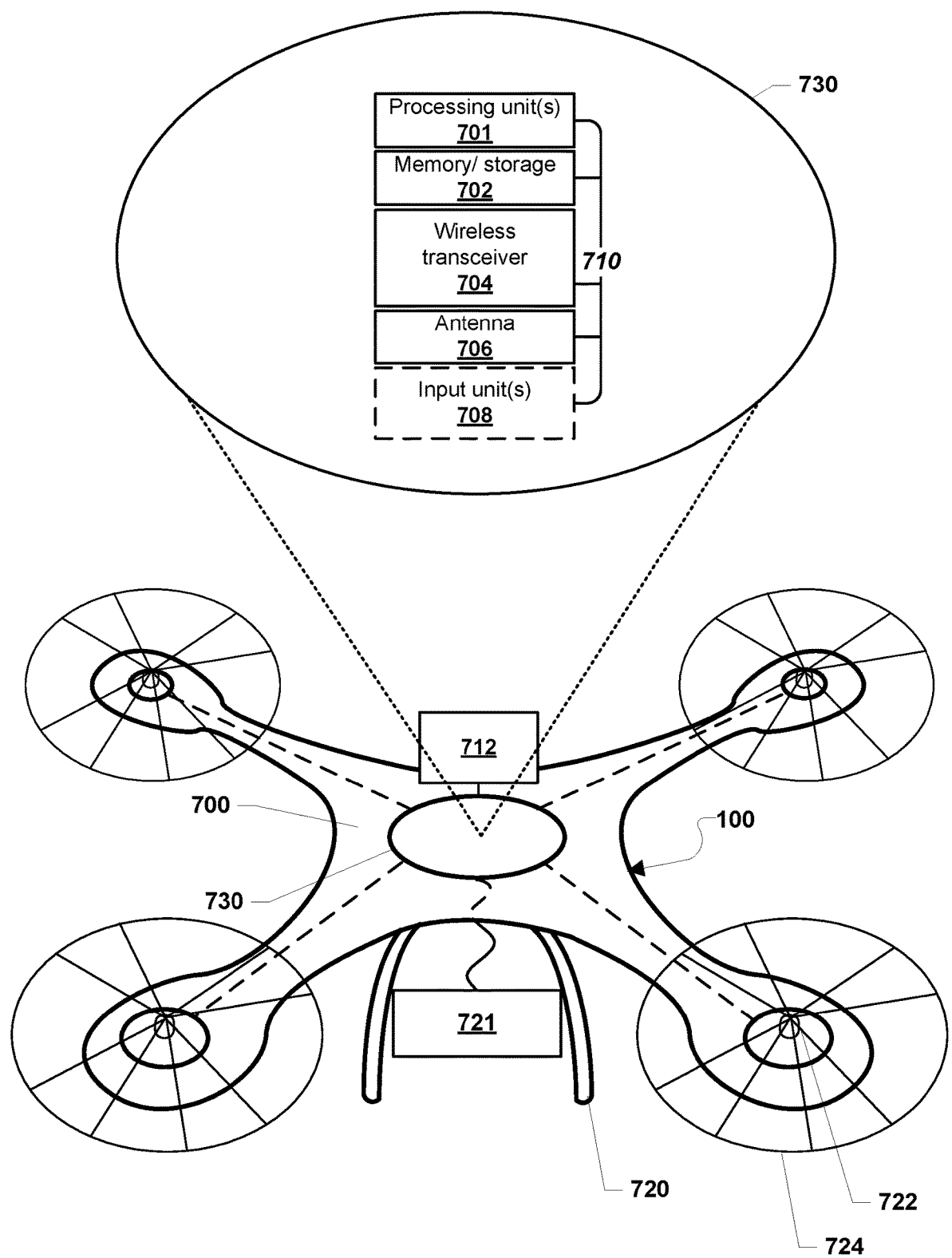
FIG. 7 is a component block diagram of a robotic vehicle, such as an aerial UAV, suitable for use with various embodiments.

Various embodiments may be implemented within a variety of robotic vehicles, an example of which in the form of a four-rotor UAV is illustrated in FIG. 7 that is suitable for use with various embodiments. With reference to FIGS. 1-7, the robotic vehicle 100 may include a body 700 (i.e., fuselage, frame, etc.) that may be made out of any combination of plastic, metal, or other materials suitable for flight. The body 700 may include a processor 730 that is configured to monitor and control the various functionalities, subsystems, and/or other components of the robotic vehicle 100. For example, the processor 730 may be configured to monitor and control various functionalities of the robotic vehicle 100, such as any combination of modules, software, instructions, circuitry, hardware, etc. related to propulsion, navigation, power management, sensor management, and/or stability management.

The processor 730 may include one or more processing unit(s) 701, such as one or more processors configured to execute processor-executable instructions (e.g., applications, routines, scripts, instruction sets, etc.), a memory and/or storage unit 702 configured to store data (e.g., flight plans, obtained sensor data, received messages, applications, etc.), and a wireless transceiver 704 and antenna 706 for transmitting and receiving wireless signals (e.g., a Wi-Fi® radio and antenna, Bluetooth®, RF, etc.). In some embodiments, the robotic vehicle 100 may also include components for communicating via various wide area networks, such as cellular network transceivers or chips and associated antenna (not shown). In some embodiments, the processor 730 of the robotic vehicle 100 may further include various input units 708 for receiving data from human operators and/or for collecting data indicating various conditions relevant to the robotic vehicle 100. For example, the input units 708 may include camera(s), microphone(s), location information functionalities (e.g., a global positioning system (GPS) receiver for receiving GPS coordinates), flight instruments (e.g., attitude indicator(s), gyroscope(s), accelerometer(s), altimeter(s), compass(es), etc.), keypad(s), etc. The various components of the processor 730 may be connected via a bus 710 or another similar circuitry.

The body 700 may include landing gear 720 of various designs and purposes, such as legs, skis, wheels, pontoons, etc. The body 700 may also include a payload mechanism 721 configured to hold, hook, grasp, envelope, and otherwise carry various payloads, such as boxes. In some embodiments, the payload mechanism 721 may include and/or be coupled to actuators, tracks, rails, ballasts, motors, and other components for adjusting the position and/or orientation of the payloads being carried by the robotic vehicle 100. For example, the payload mechanism 721 may include a box moveably attached to a rail such that payloads within the box may be moved back and forth along the rail. The payload mechanism 721 may be coupled to the processor 730 and thus may be configured to receive configuration or adjustment instructions. For example, the payload mechanism 721 may be configured to engage a motor to re-position a payload based on instructions received from the processor 730.

The robotic vehicle 100 may be of a helicopter design that utilizes one or more rotors 724 driven by corresponding motors 722 to provide lift-off (or take-off) as well as other aerial movements (e.g., forward progression, ascension, descending, lateral movements, tilting, rotating, etc.). The robotic vehicle 100 may utilize various motors 722 and corresponding rotors 724 for lifting off and providing aerial propulsion. For example, the robotic vehicle 100 may be a "quad-copter" that is equipped with four motors 722 and corresponding rotors 724. The motors 722 may be coupled to the processor 730 and thus may be configured to receive operating instructions or signals from the processor 730. For example, the motors 722 may be configured to increase rotation speed of their corresponding rotors 724, etc. based on instructions received from the processor 730. In some embodiments, the motors 722 may be independently controlled by the processor 730 such that some rotors 724 may be engaged at different speeds, using different amounts of power, and/or providing different levels of output for moving the robotic vehicle 100. For example, motors 722 on one side of the body 700 may be configured to cause their corresponding rotors 724 to spin at higher rotations per minute (RPM) than rotors 724 on the opposite side of the body 700 in order to balance the robotic vehicle 100 burdened with an off-centered payload.

The body 700 may include a power source 712 that may be coupled to and configured to power the various other components of the robotic vehicle 100. For example, the power source 712 may be a rechargeable battery for providing power to operate the motors 722, the payload mechanism 721, and/or the units of the processor 730.

Figure 8:
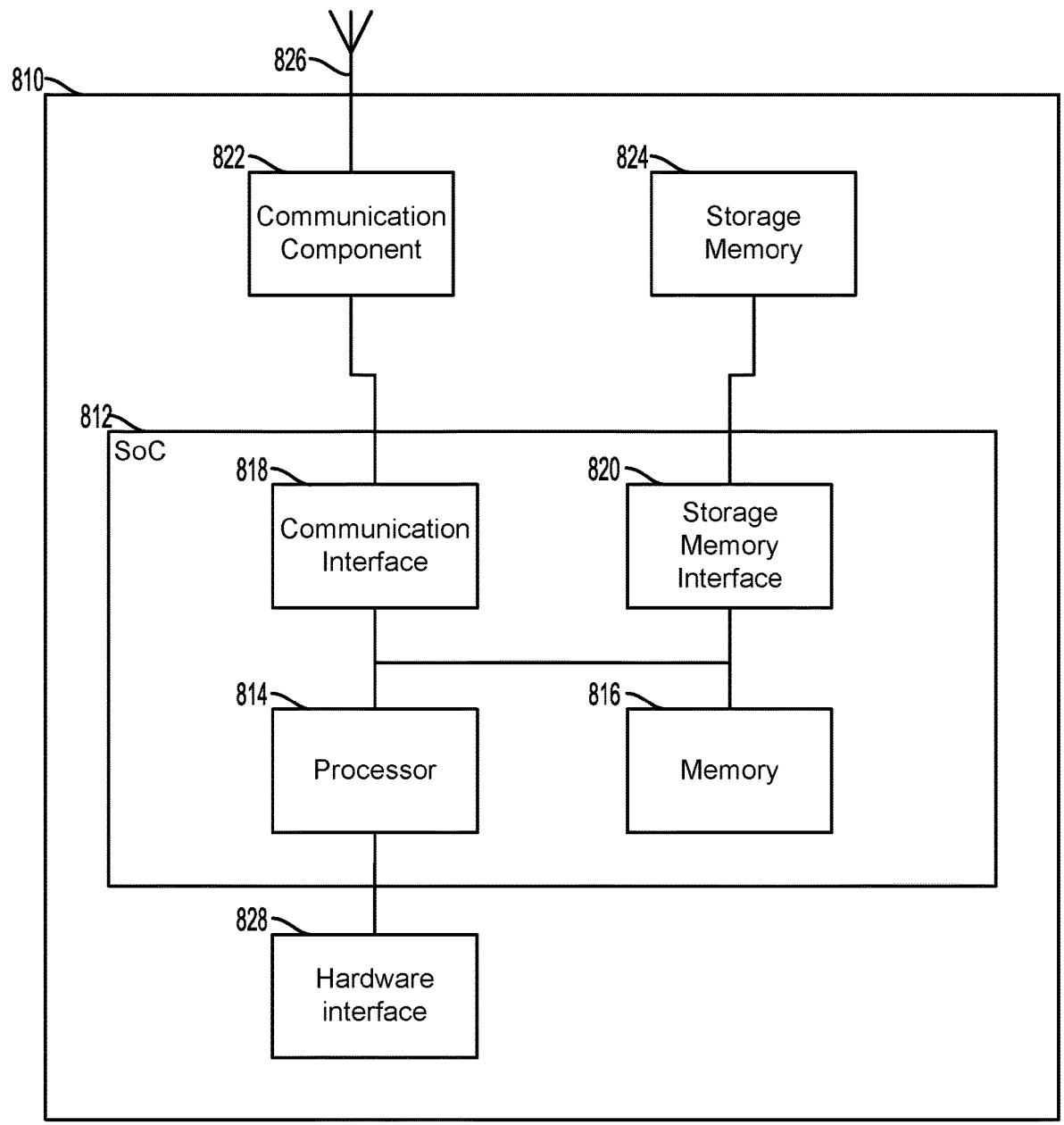
FIG. 8 is a component block diagram illustrating a processing device suitable for implementing various embodiments.

FIG. 8 is a component block diagram illustrating a processing device 810 configured to be used in a robotic vehicle and suitable for implementing various embodiments. With reference to FIGS. 1-8, a processing device 810 may be configured as or including a system-on-chip (SOC) 812. The SOC 812 may include (but is not limited to) a processor 814, a memory 816, a communication interface 818, and a storage memory interface 820. The processing device 810 or the SOC 812 may further include a communication component 822, such as a wired or wireless modem, a storage memory 824, an antenna 826 for establishing a wireless communication link, and/or the like. The processing device 810 or the SOC 812 may further include a hardware interface 828 configured to enable the processor 814 to communicate with and control various components of a robotic vehicle. The processor 814 may include any of a variety of processing devices, for example any number of processor cores.

The term "system-on-chip" (SoC) is used herein to refer to a set of interconnected electronic circuits typically, but not exclusively, including one or more processors (e.g., 814), a memory (e.g., 816), and a communication interface (e.g., 818). The SOC 812 may include a variety of different types of processors 814 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SOC 812 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The processing device 810 may include more than one SoC 812, thereby increasing the number of processors 814 and processor cores. The processing device 810 may also include processors 814 that are not associated with an SoC 812 (i.e., external to the SoC 812). Individual processors 814 may be multicore processors. The processors 814 may each be configured for specific purposes that may be the same as or different from other processors 814 of the processing device 810 or SOC 812. One or more of the processors 814 and processor cores of the same or different configurations may be grouped together. A group of processors 814 or processor cores may be referred to as a multi-processor cluster.

The memory 816 of the SoC 812 may be a volatile or non-volatile memory configured for storing data and processor-executable instructions for access by the processor 814. The processing device 810 and/or SoC 812 may include one or more memories 816 configured for various purposes. One or more memories 816 may include volatile memories such as random access memory (RAM) or main memory, or cache memory.

Some or all of the components of the processing device 810 and the SOC 812 may be arranged differently and/or combined while still serving the functions of the various aspects. The processing device 810 and the SOC 812 may not be limited to one of each of the components, and multiple instances of each component may be included in various configurations of the processing device 810.

The various processors described herein may be any programmable microprocessor, microcomputer or multiple processor chip or chips that can be configured by software instructions (applications) to perform a variety of functions, including the functions of various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, any block(s) of the method 600 may be incorporated into any one of the methods 200/300/400/500 and vice versa.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable software, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read only memory (ROM), electrically erasable programmable ROM (EEPROM), FLASH memory, compact disc ROM (CD-ROM) or other optical disk storage, magnetic disk storage or other magnetic storage smart objects, or any other medium that may be used to store desired program code in the form of instructions or data structures and that may be accessed by a computer. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of memory described herein are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method of recovering a robotic vehicle, comprising:
evaluating, by a processor of the robotic vehicle, unauthorized use indicia by:
  evaluating, by the processor, one or more trust factors, wherein evaluating one or more trust factors comprises determining whether a wireless setting of the robotic vehicle has changed; and
  increasing an unauthorized use indicia value by the processor in response to determining that the wireless setting of the robotic vehicle has changed or other trust factors are not present;
retrieving an unauthorized use indicia threshold from memory; and
identifying, by the processor, that the robotic vehicle is stolen in response to determining that a weighted combination of a plurality of unauthorized use indicia exceeds the retrieved unauthorized use indicia threshold.

2. The method of claim 1, wherein evaluating unauthorized use indicia comprises:
determining, by the processor, an Integrated Circuit Card Identifier (ICCID) of a Subscriber Identify Module (SIM) currently inserted in the robotic vehicle;
retrieving, by the processor, an ICCID previously stored in a secure memory of the robotic vehicle;
comparing, by the processor, the determined ICCID and the retrieved ICCID; and
determining, by the processor, that the robotic vehicle is stolen in response to determining that the determined ICCID does not match the retrieved ICCID.

3. The method of claim 2, wherein:
the retrieved ICCID is an ICCID of a SIM belonging to an owner or authorized operator of the robotic vehicle; and
the retrieved ICCID was previously stored in the secure memory when the SIM belonging to the owner or authorized operator was initially installed in the robotic vehicle.

4. The method of claim 1, wherein evaluating unauthorized use indicia comprises:
identifying, by the processor, a controller currently paired with the robotic vehicle; and
increasing an unauthorized use indicia value by the processor in response to determining that the currently paired robotic vehicle controller is a robotic vehicle controller not previously paired with the robotic vehicle.

5. The method of claim 1, wherein evaluating unauthorized use indicia comprises:
evaluating, by the processor, operator skills based on current operations of the robotic vehicle; and
increasing an unauthorized use indicia value by the processor in response to determining that the evaluated operator skills differ from operator skills of an owner or authorized operator of the robotic vehicle.

6. The method of claim 1, wherein evaluating unauthorized use indicia comprises:
evaluating, by the processor, whether an operator is operating the robotic vehicle in a manner that is not authorized for the operator; and
increasing an unauthorized use indicia value by the processor in response to determining that the operator is operating the robotic vehicle in a manner that is not authorized for the operator.

7. The method of claim 1, wherein evaluating unauthorized use indicia comprises:
evaluating, by the processor, whether an operator is operating the robotic vehicle in a manner that is not authorized by a law, statute or contract; and
increasing an unauthorized use indicia value by the processor in response to determining that the operator is operating the robotic vehicle in a manner that is not authorized by a law, statute or contract.

8. The method of claim 1, wherein an amount of increase in the unauthorized use indicia value is proportional to a number of trust factors that are not present.

9. The method of claim 8, wherein evaluating one or more trust factors comprises:
determining, by the processor, an amount of time that the robotic vehicle remains at a location removed from a normal operating area; and
determining that a trust factor is not present in response to determining that the time that the robotic vehicle remains at the location removed from a normal operating area exceeds a threshold.

10. The method of claim 8, wherein evaluating one or more trust factors comprises:
determining, by the processor, identifiers of wireless access points within communication range of the robotic vehicle; and
determining that a trust factor is not present in response to determining that identifiers of wireless access points within communication range of the robotic vehicle differ from identifiers of wireless access points previously observed by the robotic vehicle.

11. The method of claim 8, wherein evaluating one or more trust factors comprises:
attempting, by the processor, a two-factor authentication process with a current operator of the robotic vehicle; and
determining that a trust factor is not present in response to determining that the two-factor authentication process fails or is avoided by an operator.

12. The method of claim 8, wherein evaluating one or more trust factors comprises:
performing, by the processor, facial recognition processing of a face an image of a current operator of the robotic vehicle; and
determining that a trust factor is not present in response to failing to recognize the face of the current operator.

13. A robotic vehicle, comprising:
a memory unit; and
a processor coupled to the memory unit, wherein the processor is configured with processor-executable instructions to:
evaluate unauthorized use indicia by:
evaluating one or more trust factors, wherein evaluating one or more trust factors comprises determining whether a wireless setting of the robotic vehicle has changed; and
increasing an unauthorized use indicia value by the processor in response to determining that the wireless setting of the robotic vehicle has changed or other trust factors are not present;
retrieve an unauthorized use indicia threshold from memory; and
identify that the robotic vehicle is stolen in response to determining that a weighted combination of a plurality of unauthorized use indicia exceeds the retrieved unauthorized use indicia threshold.

14. The robotic vehicle of claim 13, wherein the processor is further configured with processor-executable instructions to evaluate unauthorized use indicia by:
determining an Integrated Circuit Card Identifier (ICCID) of a Subscriber Identify Module (SIM) currently inserted in the robotic vehicle;
retrieving an ICCID previously stored in a secure memory of the robotic vehicle;
comparing the determined ICCID and the retrieved ICCID; and
determining that the robotic vehicle is stolen in response to determining that the determined ICCID does not match the retrieved ICCID.

15. The robotic vehicle of claim 13, wherein the processor is further configured with processor-executable instructions to evaluate unauthorized use indicia by:
identifying a controller currently paired with the robotic vehicle; and
increasing an unauthorized use indicia value in response to determining that the currently paired robotic vehicle controller is a robotic vehicle controller not previously paired with the robotic vehicle.

16. The robotic vehicle of claim 13, wherein the processor is further configured with processor-executable instructions to evaluate unauthorized use indicia by:
evaluating operator skills based on current operations of the robotic vehicle; and
increasing an unauthorized use indicia value in response to determining that the evaluated operator skills differ from operator skills of an owner or authorized operator of the robotic vehicle.

17. The robotic vehicle of claim 13, wherein the processor is further configured with processor-executable instructions to evaluate unauthorized use indicia by:
evaluating whether an operator is operating the robotic vehicle in a manner that is not authorized for the operator; and
increasing an unauthorized use indicia value by the processor in response to determining that the operator is operating the robotic vehicle in a manner that is not authorized for the operator.

18. The robotic vehicle of claim 13, wherein the processor is further configured with processor-executable instructions to evaluate unauthorized use indicia by:
evaluating whether an operator is operating the robotic vehicle in a manner that is not authorized by a law, statute or contract; and
increasing an unauthorized use indicia value by the processor in response to determining that the operator is operating the robotic vehicle in a manner that is not authorized by a law, statute or contract.

19. The robotic vehicle of claim 13, wherein an amount of increase in the unauthorized use indicia value is proportional to a number of trust factors that are not present.

20. The robotic vehicle of claim 19, wherein the processor is further configured with processor-executable instructions to evaluate one or more trust factors by:
determining an amount of time that the robotic vehicle remains at a location removed from a normal operating area; and
determining that a trust factor is not present in response to determining that the time that the robotic vehicle remains at the location removed from a normal operating area exceeds a threshold.

21. The robotic vehicle of claim 19, wherein the processor is further configured with processor-executable instructions to evaluate presence of one or more trust factors by:
determining identifiers of wireless access points within communication range of the robotic vehicle; and
determining that a trust factor is not present in response to determining that identifiers of wireless access points within communication range of the robotic vehicle differ from identifiers of wireless access points previously observed by the robotic vehicle.

22. The robotic vehicle of claim 19, wherein the processor is further configured with processor-executable instructions to evaluate presence of one or more trust factors by:
attempting a two-factor authentication process with a current operator of the robotic vehicle; and
determining that a trust factor is not present in response to determining that the two-factor authentication process fails or is avoided by an operator.

23. The robotic vehicle of claim 19, wherein the processor is further configured with processor-executable instructions to evaluate presence of one or more trust factors by:
performing facial recognition processing of a face an image of a current operator of the robotic vehicle; and
determining that a trust factor is not present in response to failing to recognize the face of the current operator.

24. A robotic vehicle, comprising:
means for storing a threshold value;
means for evaluating unauthorized use indicia comprising:
means for evaluating one or more trust factors, wherein the means for evaluating one or more trust factors comprises means for determining whether a wireless setting of the robotic vehicle has changed; and
means for increasing an unauthorized use indicia value in response to determining that the wireless setting of the robotic vehicle has changed or other trust factors are not present;
means for retrieving an unauthorized use indicia threshold value from memory; and
means for identifying that the robotic vehicle is stolen in response to determining that a weighted combination of a plurality of unauthorized use indicia exceeds the retrieved unauthorized use indicia threshold value.

25. A processing device for use in a robotic vehicle, wherein the processing device is configured to:
evaluate unauthorized use indicia by:
evaluating one or more trust factors, wherein evaluating one or more trust factors comprises determining whether a wireless setting of the robotic vehicle has changed; and increasing an unauthorized use indicia value by the processing device in response to determining that the wireless setting of the robotic vehicle has changed or other trust factors are not present;

retrieve an unauthorized use indicia threshold from memory; and identify that a robotic vehicle is stolen in response to determining that a weighted combination of a plurality of unauthorized use indicia exceeds the retrieved unauthorized use indicia threshold.

26. The processing device of claim 25, wherein the processing device is further configured to evaluate unauthorized use indicia by:

determining an Integrated Circuit Card Identifier (ICCID) of a Subscriber Identify Module (SIM) currently inserted in the robotic vehicle;

retrieving an ICCID previously stored in a secure memory of the robotic vehicle;

comparing the determined ICCID and the retrieved ICCID; and determining that the robotic vehicle is stolen in response to determining that the determined ICCID does not match the retrieved ICCID.

27. The processing device of claim 25, wherein the processing device is further configured to evaluate unauthorized use indicia by:

identifying a controller currently paired with the robotic vehicle; and increasing an unauthorized use indicia value in response to determining that the currently paired robotic vehicle controller is a robotic vehicle controller not previously paired with the robotic vehicle.

28. The processing device of claim 25, wherein the processing device is further configured to evaluate unauthorized use indicia by:

evaluating operator skills based on current operations of the robotic vehicle; and increasing an unauthorized use indicia value in response to determining that the evaluated operator skills differ from operator skills of an owner or authorized operator of the robotic vehicle.

29. The processing device of claim 25, wherein an amount of increase in the unauthorized use indicia value is proportional to a number of trust factors that are not present.

30. The processing device of claim 29, wherein the processing device is further configured with processor-executable instructions to evaluate one or more trust factors by:

determining an amount of time that the robotic vehicle remains at a location removed from a normal operating area; and determining that a trust factor is not present in response to determining that the time that the robotic vehicle remains at the location removed from a normal operating area exceeds a threshold.

31. The method of claim 8, wherein determining whether a wireless setting of the robotic vehicle has changed comprises:

determining, by the processor, whether a Wi-Fi setting of the robotic vehicle has changed; and determining that a trust factor is not present in response to determining that the Wi-Fi setting of the robotic vehicle has changed.

32. The robotic vehicle of claim 19, wherein the processor is further configured with processor-executable instructions to determine whether a wireless setting of the robotic vehicle has changed by:

determining whether a Wi-Fi setting of the robotic vehicle has changed; and determining that a trust factor is not present in response to determining that the Wi-Fi setting of the robotic vehicle has changed.

33. The robotic vehicle of claim 29, wherein the processor is further configured with processor-executable instructions to determine whether a wireless setting of the robotic vehicle has changed by:

determining whether a Wi-Fi setting of the robotic vehicle has changed; and determining that a trust factor is not present in response to determining that the Wi-Fi setting of the robotic vehicle has changed.

34. The method of claim 1, further comprising:

in response to identifying the robotic vehicle is stolen:

determining an opportunity for the robotic vehicle to perform a recovery action; and performing the recovery action at the determined opportunity.

35. The robotic vehicle of claim 13, wherein the processor is further configured with processor-executable instructions to:

in response to identifying the robotic vehicle is stolen:

determine an opportunity for the robotic vehicle to perform a recovery action; and perform the recovery action at the determined opportunity.

36. The processing device of claim 25, wherein the processing device is further configured to:

in response to identifying the robotic vehicle is stolen:

determine an opportunity for the robotic vehicle to perform a recovery action; and perform the recovery action at the determined opportunity.

* * * * *